(12) United States Patent (10) Patent No.: US 7,994,661 B2
Qiu (45) Date of Patent: Aug. 9, 2011

(54) DUAL LINEAR ELECTRODYNAMIC SYSTEM AND METHOD

(75) Inventor: Songgang Qiu, Richland, WA (US)

(73) Assignee: Infinia Corporation, Kennewick, WA (US)

( * ) Notice: Subject to any disclaimer, the term of this patent is extended or adjusted under 35 U.S.C. 154(b) by 0 days.

(21) Appl. No.: 12/581,744

(22) Filed: Oct. 19, 2009

(65) Prior Publication Data

US 2010/0038976 A1    Feb. 18, 2010

Related U.S. Application Data

(63) Continuation of application No. 11/258,397, filed on Oct. 24, 2005, now abandoned.

(60) Provisional application No. 60/686,513, filed on May 31, 2005.

(51) Int. Cl.
*H02K 33/02* (2006.01)
*H02K 33/04* (2006.01)

(52) U.S. Cl. ............. 310/12.24; 310/15; 310/12.26; 417/417

(58) Field of Classification Search .... 310/12.24–12.27, 310/15, 23, 24; 417/417
See application file for complete search history.

(56) References Cited

U.S. PATENT DOCUMENTS

| 4,697,113 A | 9/1987 | Young |
| 4,827,163 A | 5/1989 | Bhate et al. |
| 5,208,498 A | 5/1993 | Hamajima |
| 6,417,583 B1 | 7/2002 | Okada |
| 6,653,753 B1 | 11/2003 | Kawano et al. |
| 6,657,326 B1 | 12/2003 | Yamamoto et al. |
| 6,798,103 B2 | 9/2004 | Tajima et al. |
| 6,927,506 B2 * | 8/2005 | Corey ............ 310/12.24 |
| 6,930,414 B2 | 8/2005 | Qiu |
| 2002/0113497 A1 | 8/2002 | Park et al. |
| 2003/0052560 A1 | 3/2003 | Chang et al. |
| 2006/0181157 A1 | 8/2006 | Qiu |
| 2006/0267415 A1 | 11/2006 | Qiu |
| 2010/0038976 A1 * | 2/2010 | Qiu ............ 310/12.24 |

FOREIGN PATENT DOCUMENTS

| DE | 10055080 | 5/2002 |
| JP | 2000245126 | 9/2000 |
| JP | 2001078417 | 3/2001 |
| JP | 2002034226 | 1/2002 |

OTHER PUBLICATIONS

Translation of jp 2001-078417, "linear actuator", Kiriyama Feb. 23, 2003.
Translation of jp 2002-034226, "moveable magnet type linear motor", Hida et al., Jan. 31, 2002.
Machine Translation of JP 2000-245126, Sep. 8, 2000, "Linear Vibrating Motor", Ueda.

* cited by examiner

*Primary Examiner* — Karl I Tamai
(74) *Attorney, Agent, or Firm* — Davis Wright Tremaine LLP; George C. Rondeau, Jr.; Heather M. Colburn

(57) ABSTRACT

An exemplary description provided for patent searches includes a linear electrodynamic system involving conversions between electrical power and mechanical motion uses unique magnet assemblies that move and unique stator assemblies and stator members shaped and oriented with respect to the moving magnet assemblies.

25 Claims, 34 Drawing Sheets

DUAL LINEAR ELECTRODYNAMIC SYSTEM AND METHOD

BACKGROUND OF THE INVENTION

Description of the Related Art

Linear electrodynamic systems including linear alternators and linear motors are used in conversions between electrical power and mechanical motion. Increases in conversion efficiencies and reductions in material usage and costs involved with production of these systems can be desirable.

BRIEF DESCRIPTION OF THE SEVERAL VIEWS OF THE DRAWING(S)

DETAILED DESCRIPTION OF THE INVENTION

As will be discussed in greater detail herein, an innovative linear electrodynamic system and method is disclosed to convert linear mechanical motion into an electrical current such as for a linear alternator for heat engines including Stirling cycle engines, or to convert electrical current into linear mechanical motion such as for a linear motor associated with mechanical cooling devices. The linear electrodynamic system uses magnets coupled to a moving shaft and positioned to move between stator components. By virtue of being positioned to move between stator elements, for each magnet of the linear electrodynamic system, magnetic flux lines pass from a stator component on a first side of the magnet to another stator component on a second side of the magnet.

Figure 1:
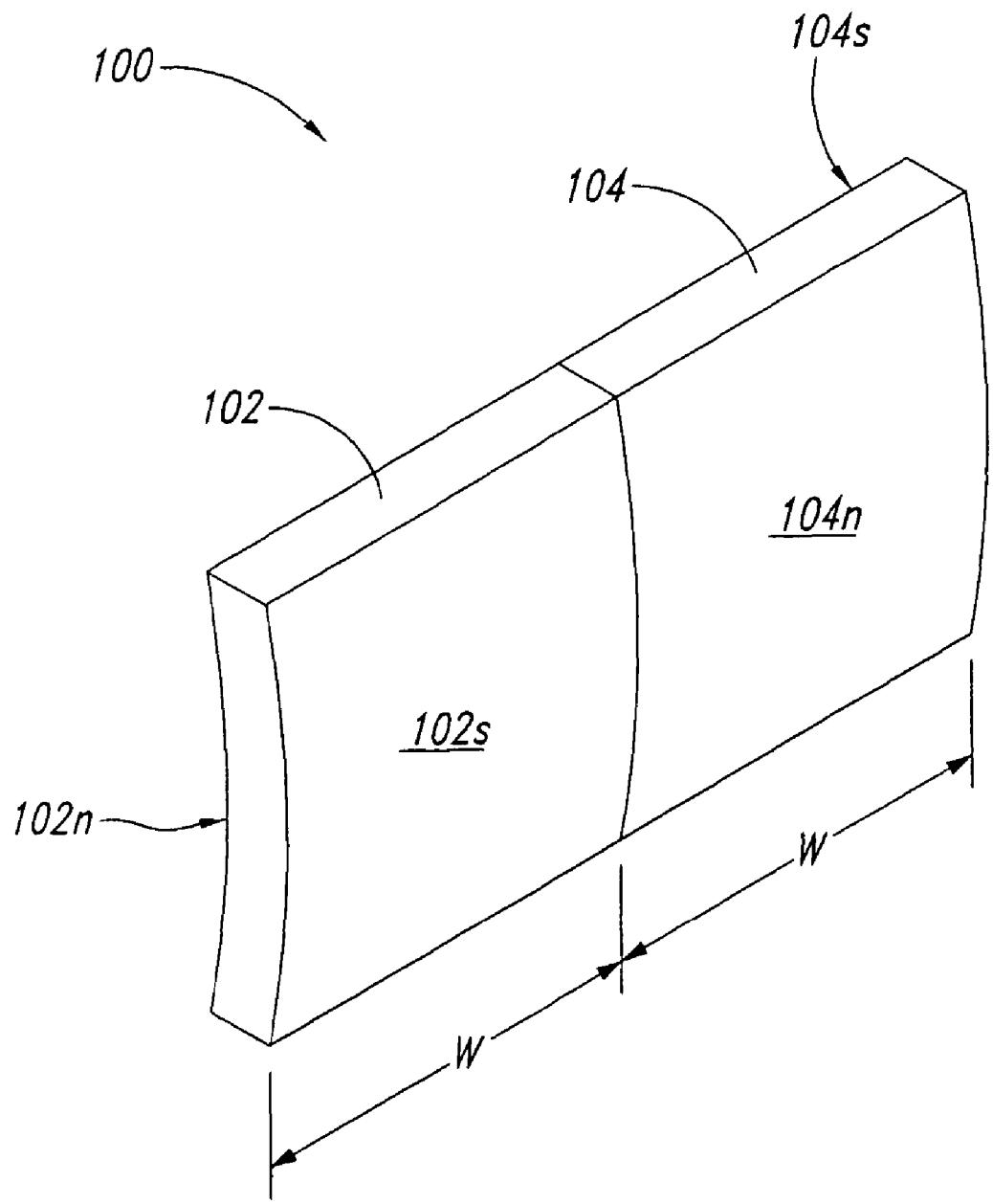
FIG. 1 is an isometric view of a magnet pair.

The linear electrodynamic system can use multiple exemplary magnet pairs 100 shown in FIG. 1 having a first magnet 102 with a south pole surface 102s and a north pole surface 102n and having a second magnet 104 adjacent to the first magnet 102. The second magnet 104 has a south pole surface 104s and a north pole surface 104n on opposite sides of the magnet pair 100 as are on the first magnet 102 so that the magnet pair has an alternating south pole and north pole arrangement on both sides of the magnet pair. The first magnet 102 can be a single magnet or a composite of smaller magnets or laminations of magnetic material and be composed of various conventionally known magnetic materials. The second magnet 104 can also be a single magnet or a composite. Both the first magnet 102 and the second magnet 104 have a width, W.

Shown in FIG. 1, the magnet pair 100 is slightly curved such that the first magnet 102 has its south pole surface 102s and the second magnet 104 has its north pole surface 104n on the convex side of the magnet pair. Furthermore, the first magnet 102 has its north pole surface 102n and the second magnet 104 has its south pole surface 104s on the concave side of the magnet pair 100. As will be seen with alternative exemplary implementations, the magnet pair 100 can be curved in other ways depending upon the particular implementation of the linear electrodynamic system.

Figure 2:
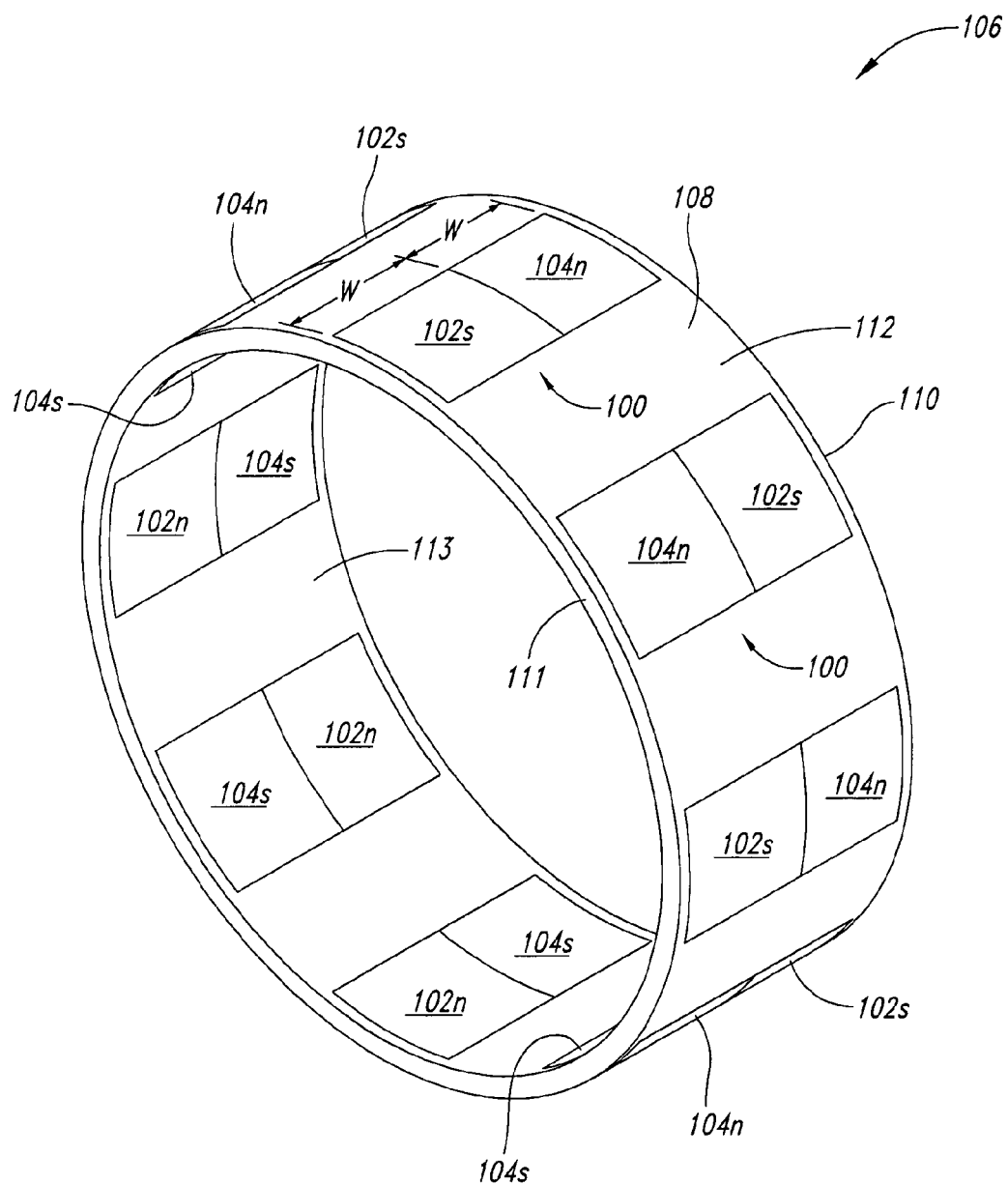
FIG. 2 is an isometric view of a magnet assembly including a plurality of the magnet pairs of FIG. 1.

An exemplary magnet assembly 106, shown in FIG. 2, has a holder portion 108 with a first illustrative edge 110, a second illustrative edge 111, an exterior surface 112, and an interior surface 113. The holder portion 108 typically is an integral part of a larger assembly as discussed below. Consequently, the first illustrative edge 110 and the second illustrative edge 111 may not be actual edges since the holder portion 108 may not be necessarily a separately distinct member as utilized. The magnet pairs 100 are positioned in the holder portion 108 such that the north pole surface 104n of the second magnet 104 is near the first illustrative edge 110 for every other one of the magnet pairs. For the other of the magnet pairs 100, the north pole surface 104n of the second magnet 104 is near the second illustrative edge 111. The north pole surface 104n of the second magnet 104 is positioned in the holder portion 108 to substantially coincide with the exterior surface 112 of the holder portion. Similarly, the south pole surface 104s of the second magnet 104 substantially coincides with the interior surface 113 of the holder portion.

Figure 3:
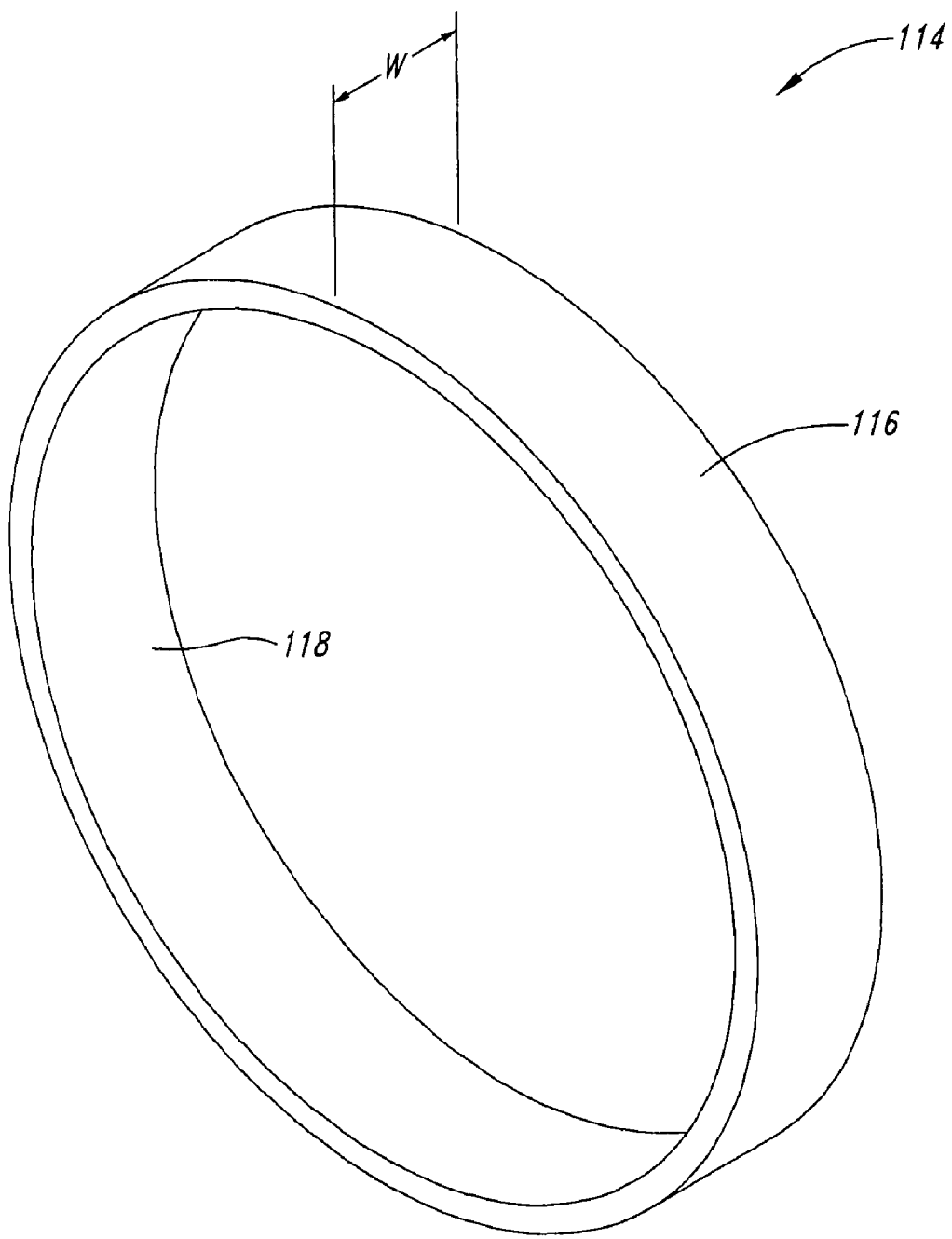
FIG. 3 is an isometric view of an exemplary stator member.

A stator member 114 is shown in FIG. 3 to be substantially cylindrical with an outer surface 116 and an inner surface 118. In this first depicted implementation, the stator member 114 is sized to concentrically receive therewithin in coaxial arrangement the magnet assembly 106 further discussed below. The stator member 114 has a width substantially equal to the width, W, of the first magnet 102 and the second magnet 104.

Figure 4:
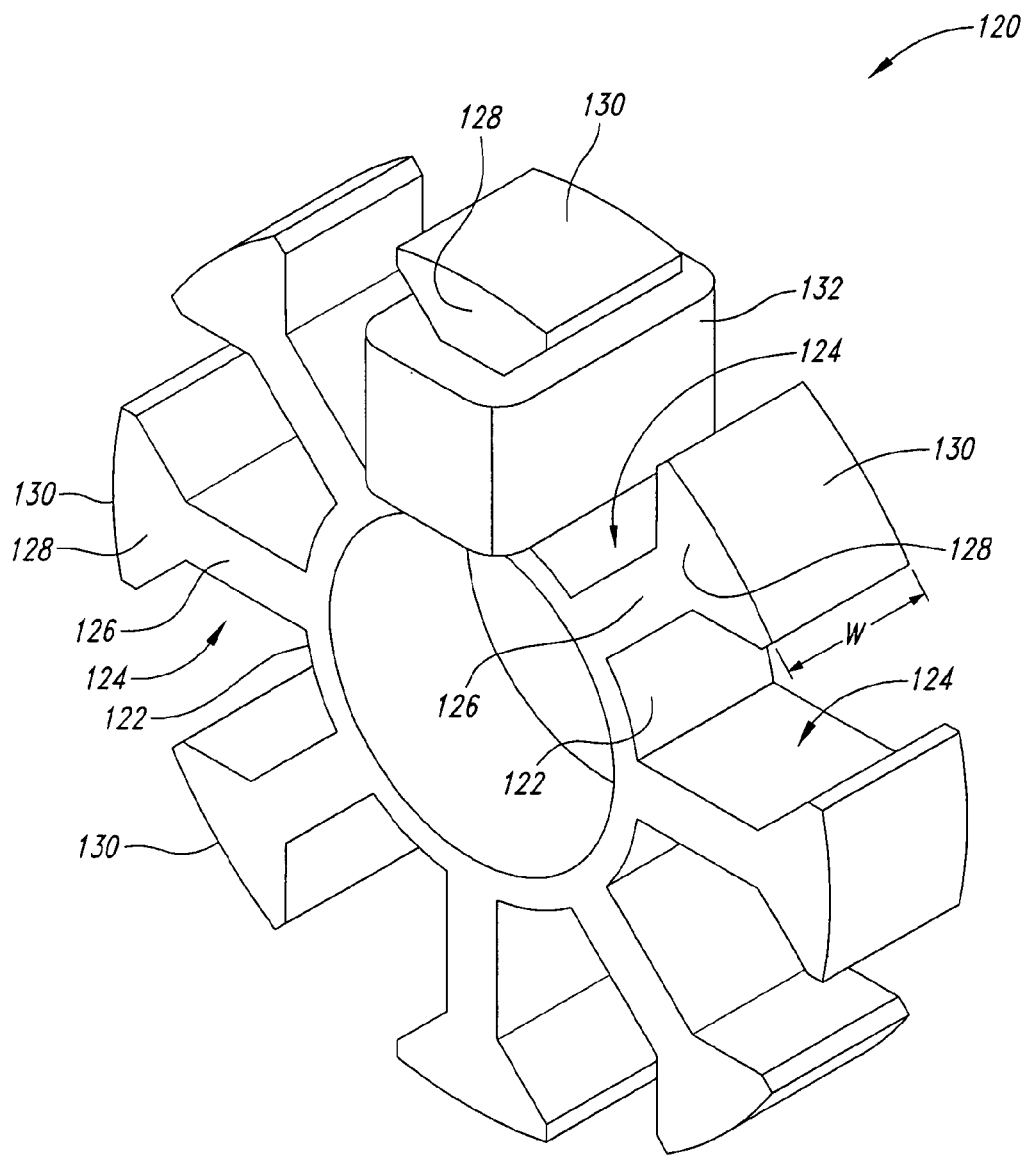
FIG. 4 is an isometric view of an exemplary stator assembly.

A stator assembly 120 is shown in FIG. 4 as having a pole support 122 and stator poles 124 extending from the pole support. The stator poles 124 include a mid-portion 126 and an end portion 128. The end portion 128 is shown to be flared with an expanded end surface 130. A representative winding 132 is shown wound around the mid-portion 126 of one of the stator poles 124, which is partially held in place by the flared end portion 128. The end portions 128 of the stator poles 124 each have a width substantially equal to the width, W, of the first magnet 102 and the second magnet 104. As further shown, the windings 132 are wound around the mid-portion 126 of each of the stator poles 124.

Figure 5:
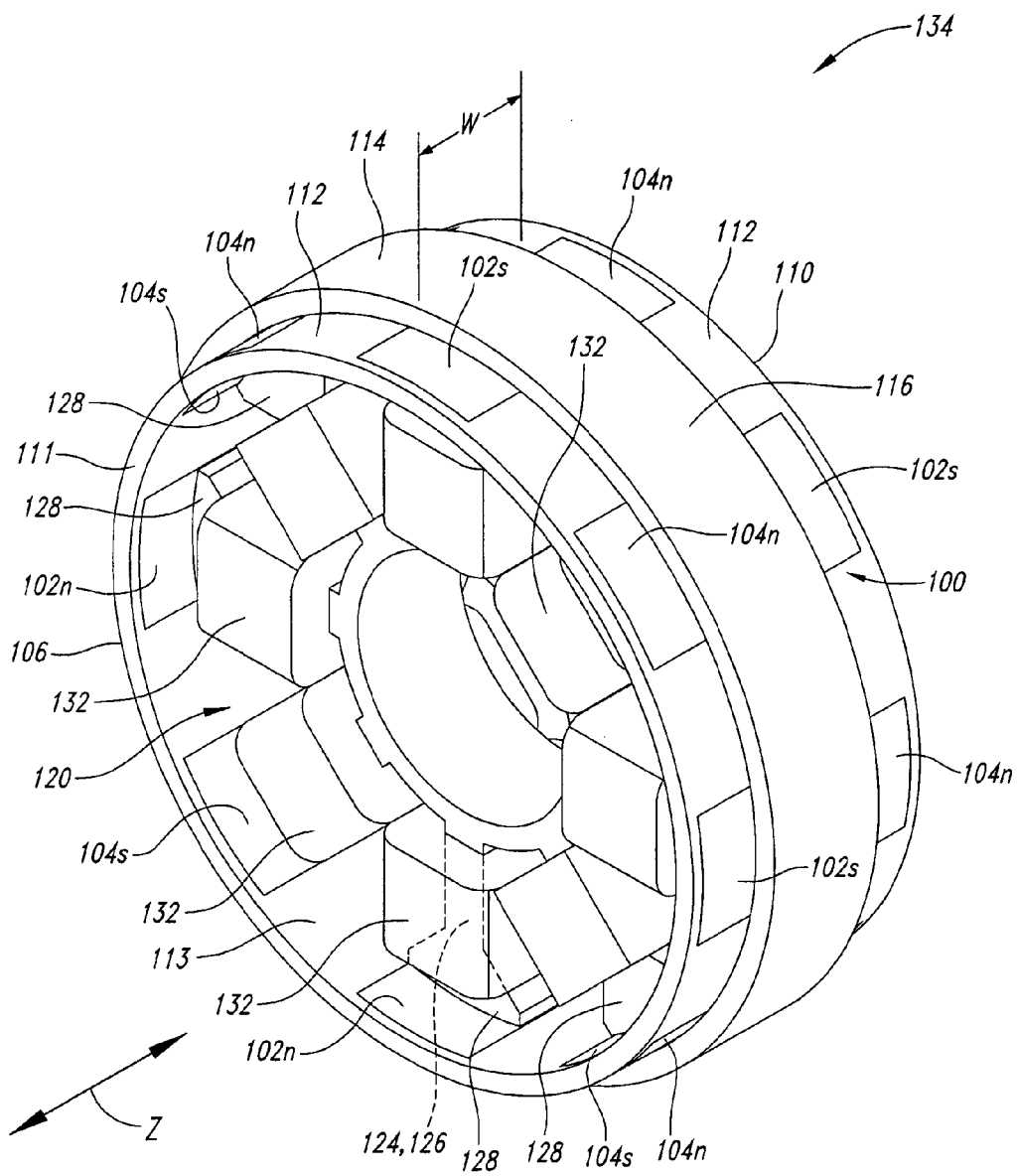
FIG. 5 is an isometric view of an exemplary linear electrodynamic assembly including the magnet assembly of FIG. 2, the stator member of FIG. 3, and the stator assembly of FIG. 4.
Figure 6:
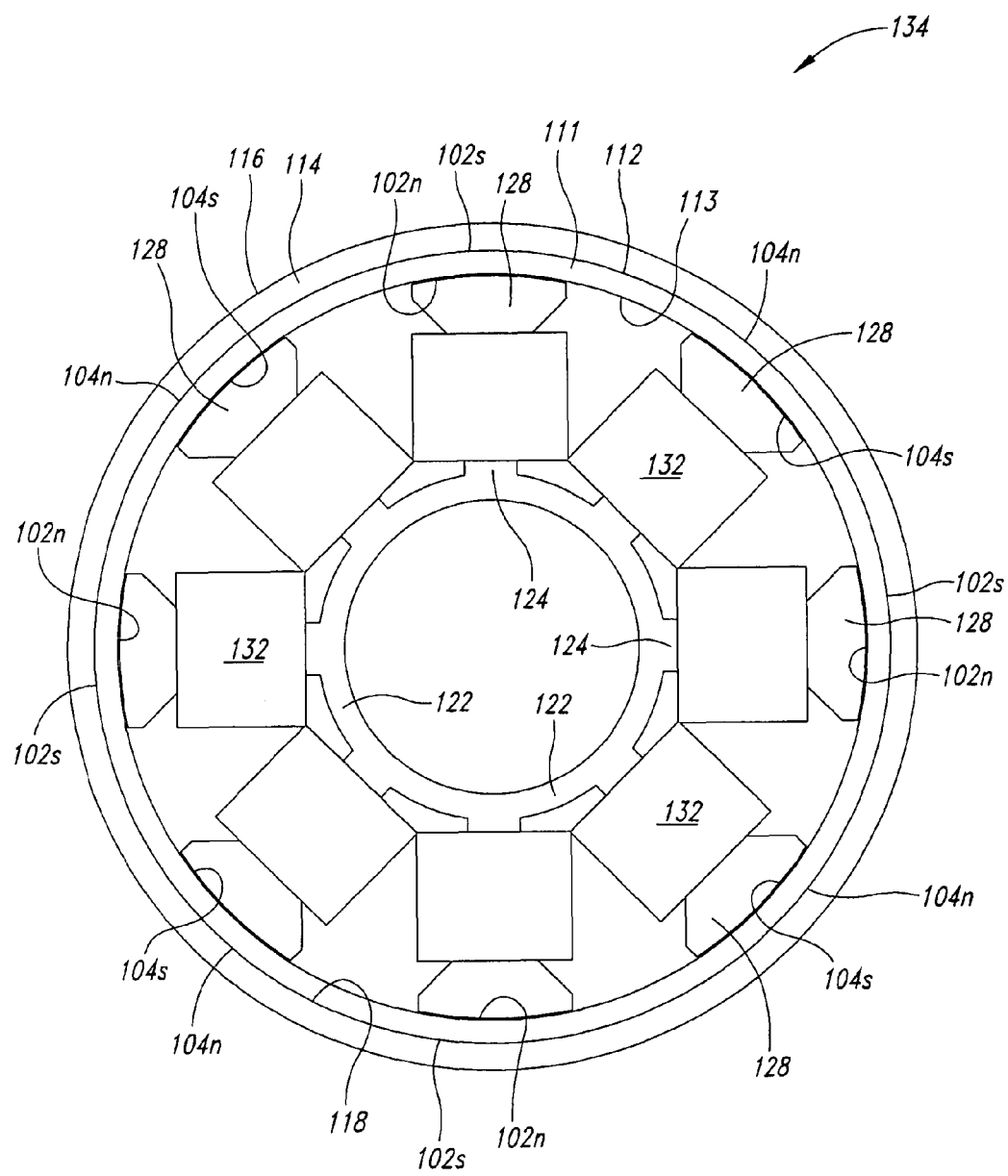
FIG. 6 is an elevational end view of the linear electrodynamic assembly of FIG. 5.

A linear electrodynamic assembly 134 is shown in FIGS. 5 and 6 as having the stator assembly 120 concentrically positioned inside of the magnet assembly 106 in coaxial arrangement. In turn, the magnet assembly 106 is concentrically positioned inside of the stator member 114 in coaxial arrangement. In operation, the magnet assembly 106 reciprocates along a path of travel substantially parallel with a Z axis shown in FIG. 5. Consequently, for each of the stator poles 124, one of the first magnets 102 and one of the second magnets 104 consecutively pass by both the end surface 130 of the stator pole and the inner surface 118 of the stator member 114 as the magnet assembly 106 axially reciprocates.

Figure 7:
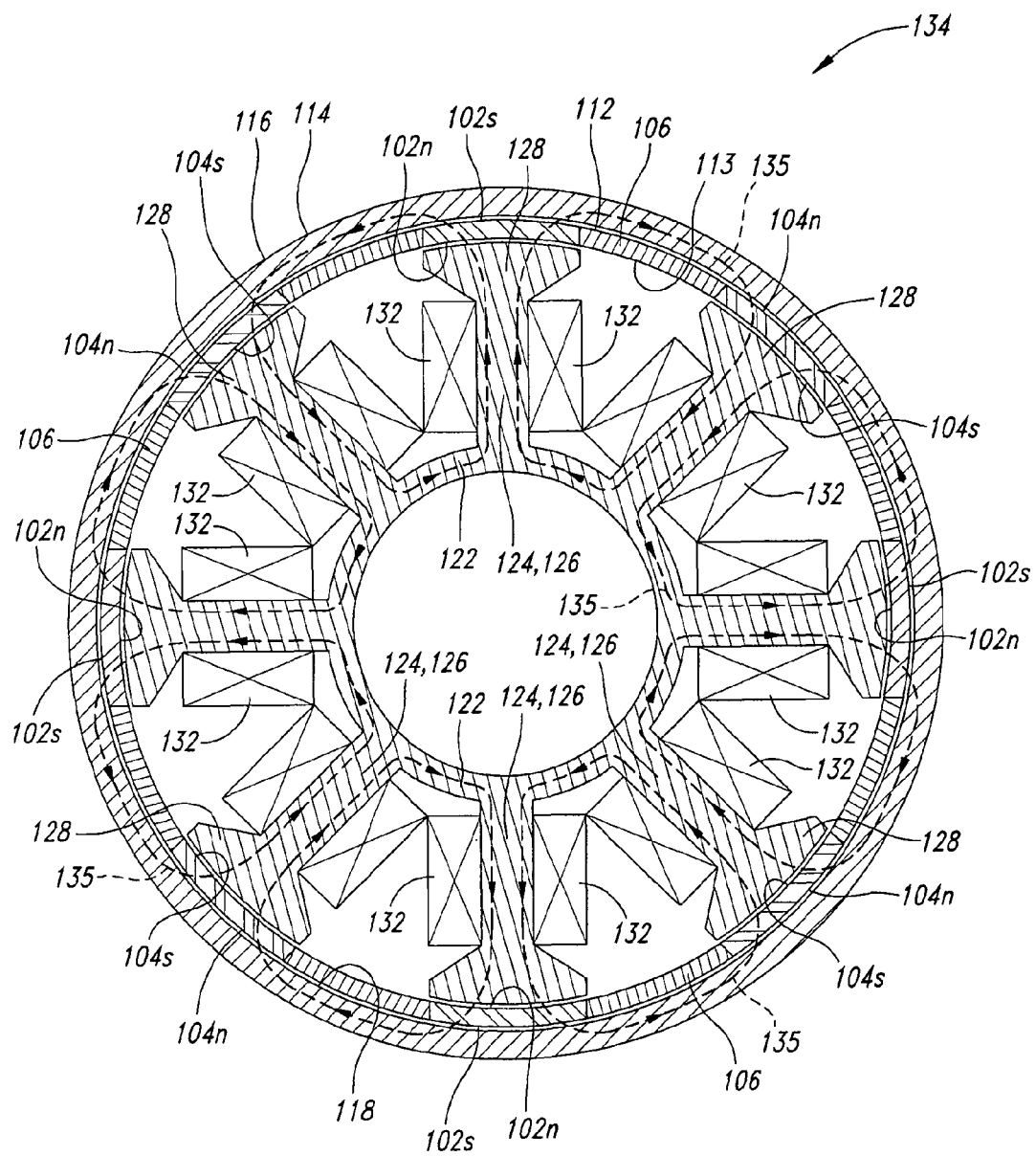
FIG. 7 is a cross-sectional end view of the linear electrodynamic assembly of FIG. 5 showing illustrative magnetic flux lines.

Magnetic flux lines 135 are shown in FIG. 7, each completing a loop through adjacent ones of the stator poles 124. In tracing one of the loops, each of the flux lines 135 emits from the south pole surface 102s of one of the first magnets 102 (for instance, positioned adjacent the stator pole 124 at the 6:00 position of FIG. 7) into the stator member 114. The flux line 135 then follows along inside of the stator member 114 to enter into the north pole surface 104n of one of the second magnets 104 (for instance, positioned adjacent the stator pole 124 between 3:00 and 6:00 positions of FIG. 7). The flux line 135 then travels through the second magnet 104 and through the stator pole 124 adjacent the second magnet, on through the pole support 122, on through the stator pole 124 adjacent the first magnet 102 in the loop, and on through the first magnet to complete the loop.

Figure 8:
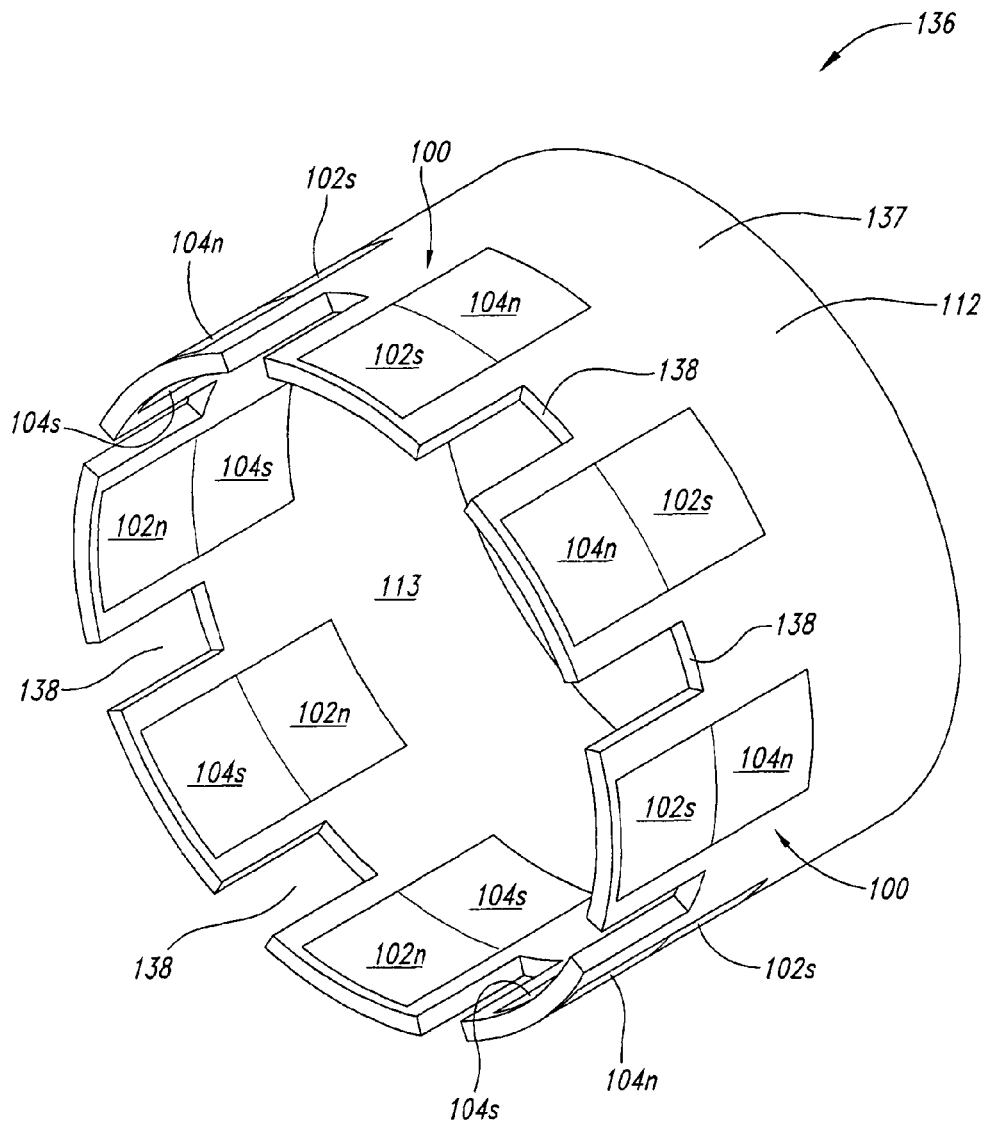
FIG. 8 is an isometric view of an exemplary slotted magnet assembly.

A slotted magnet assembly 136 is shown in FIG. 8 as having a slotted holder portion 137 containing the magnet pairs 100 as described above for the magnet assembly 106. The slotted holder portion 137 has slots 138 that are used to allow for more compact linear electrodynamic system implementations. The slots 138 are sized to allow a full range of motion of the first magnets 102 and the second magnets 104 to align each of them with the stator member 114 and the end surfaces 130 of the stator poles 124 at different points of travel of the magnet assembly 106. The slotted holder portion 137 is shown as part of a slotted mover 139 in FIG. 9 in combination with a coupler portion 140. The coupler portion 140 is used to secure the slotted mover 139 as described further below.

In the implementation depicted above, the stator member 114 is configured for concentric positioning in juxtaposition with the outer surface 112 of the holder portion 108 and the magnet pairs 100, and the stator assembly 120 is configured for concentric positioning in juxtaposition with the inner surface 113 of the holder portion. In other implementations, the stator member 114 is configured for concentric positioning in juxtaposition with the inner surface 113 and the stator assembly 120 is configured for concentric positioning in juxtaposition with the outer surface 112.

Figure 9:
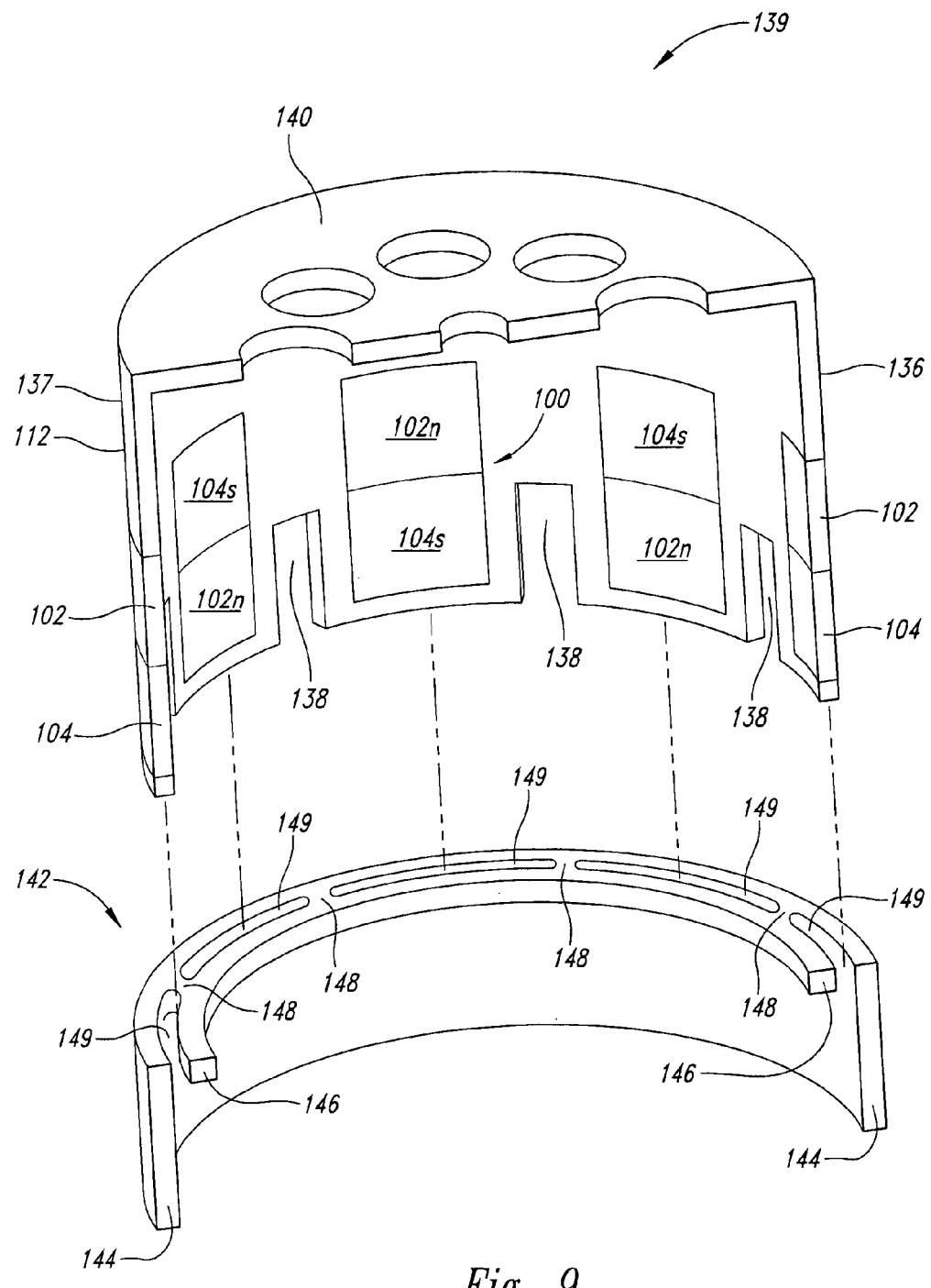
FIG. 9 is an isometric cross-sectional view of an exemplary slotted mover having the slotted magnet assembly shown in FIG. 8 and an exemplary support member.

For exemplary linear electrodynamic systems using the slotted mover 139, a support member 142, shown in FIG. 9, has an outer stator support portion 144 that can be used to support one of the stator member 114 or the stator assembly 120 configured to be concentrically juxtapositioned with the outer surface 112 of the slotted holder portion 137. The support member 142 has an inner stator support portion 146 that can be used to support one of the stator member 114 or the stator assembly 120 configured to be concentrically juxtapositioned with the inner surface 113 of the slotted holder portion 137. The support member 142 has coupler portions 148 to attach the inner stator support portion 146 to the outer stator support portion 144 with slots 149 that receive the slotted mover 139. The slotted mover 139 is aligned with the support member 142 so that the slots 138 of the slotted mover receive the coupler portions 148 of the slotted mover therein during reciprocal motion of the slotted mover.

Figure 10:
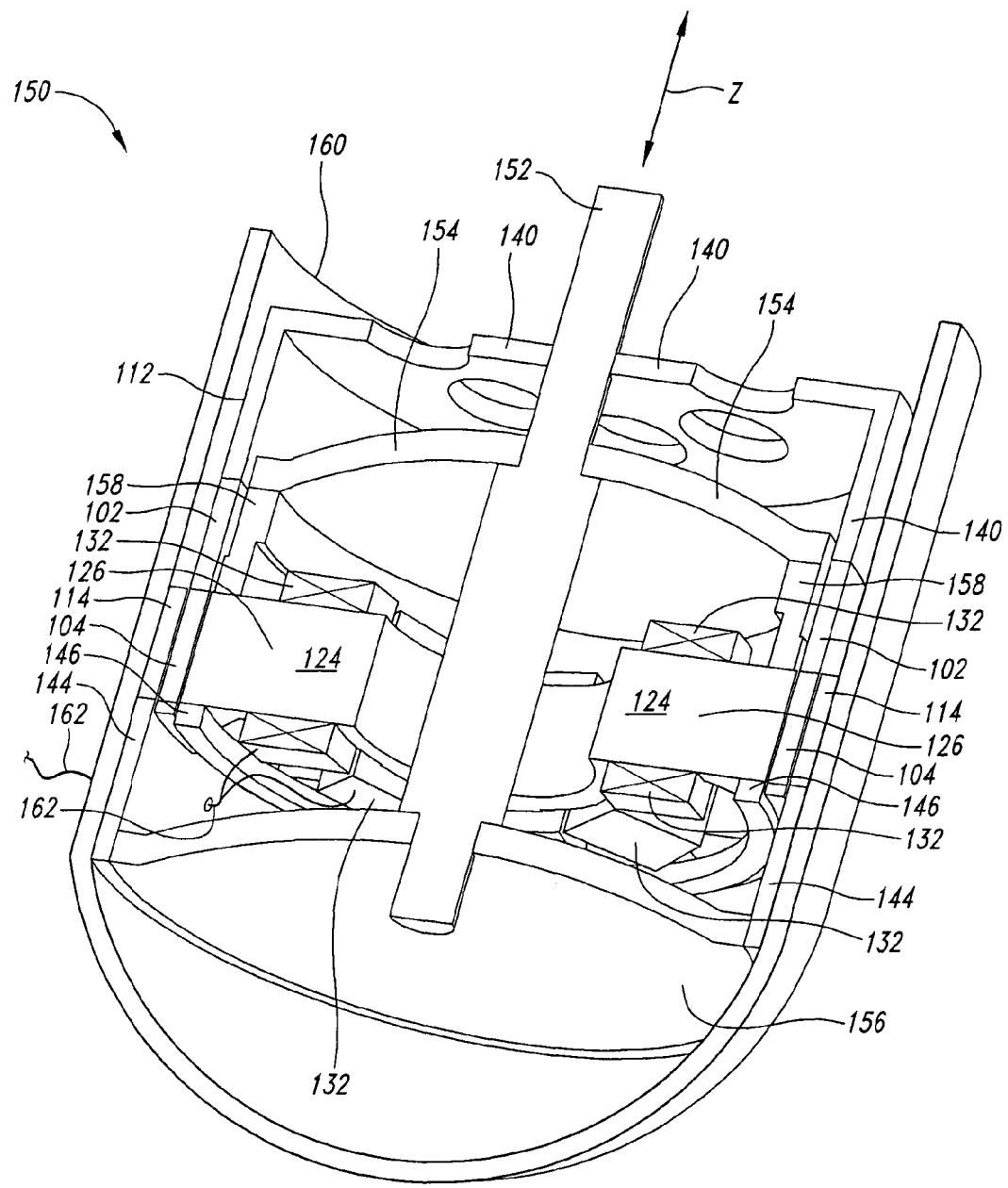
FIG. 10 is an isometric cross-sectional view of an exemplary linear electrodynamic system with the slotted mover of FIG. 9 shown in a first end position.
Figure 11:
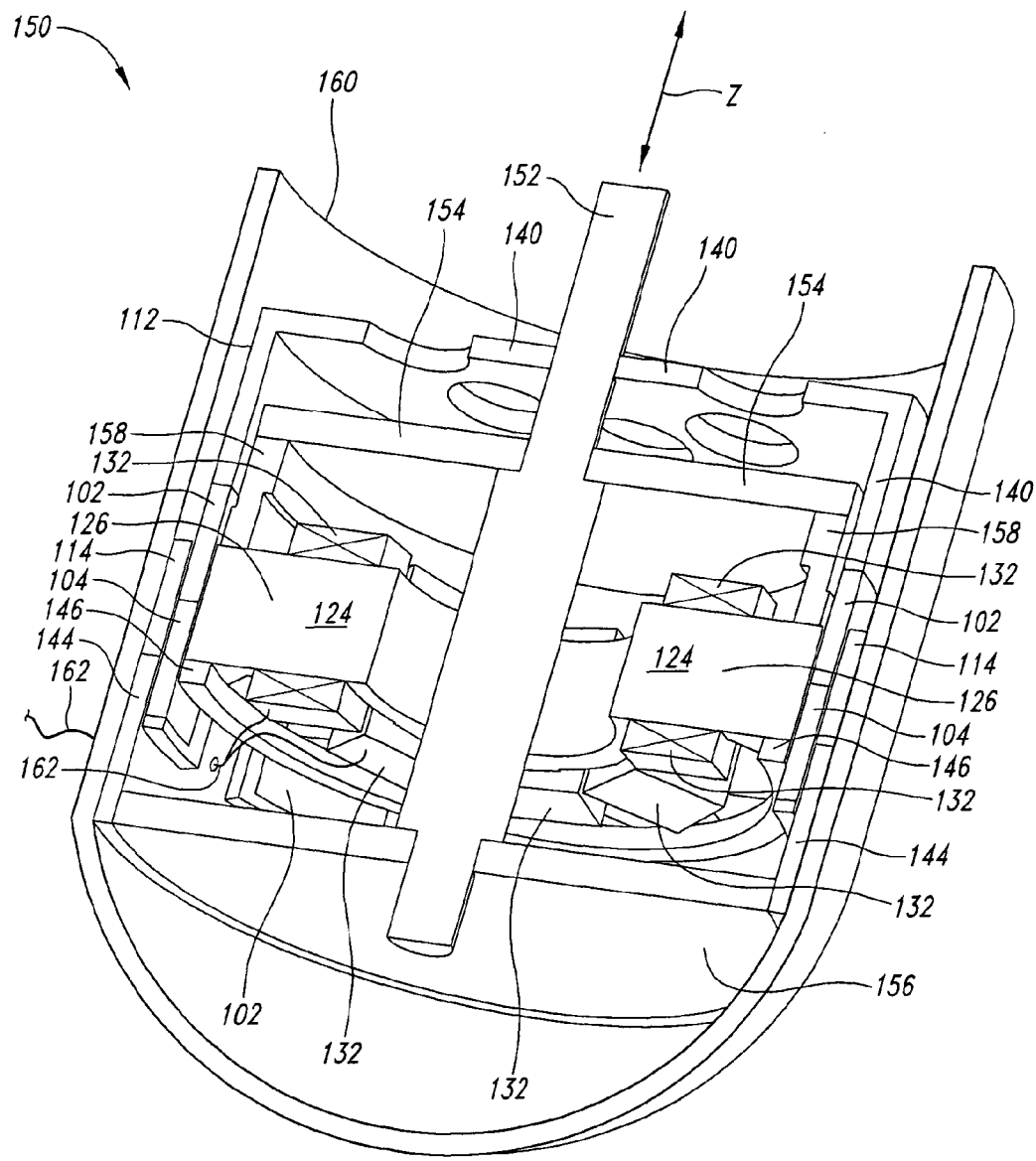
FIG. 11 is an isometric cross-sectional view of FIG. 10 with the slotted mover shown in a mid-position.
Figure 12:
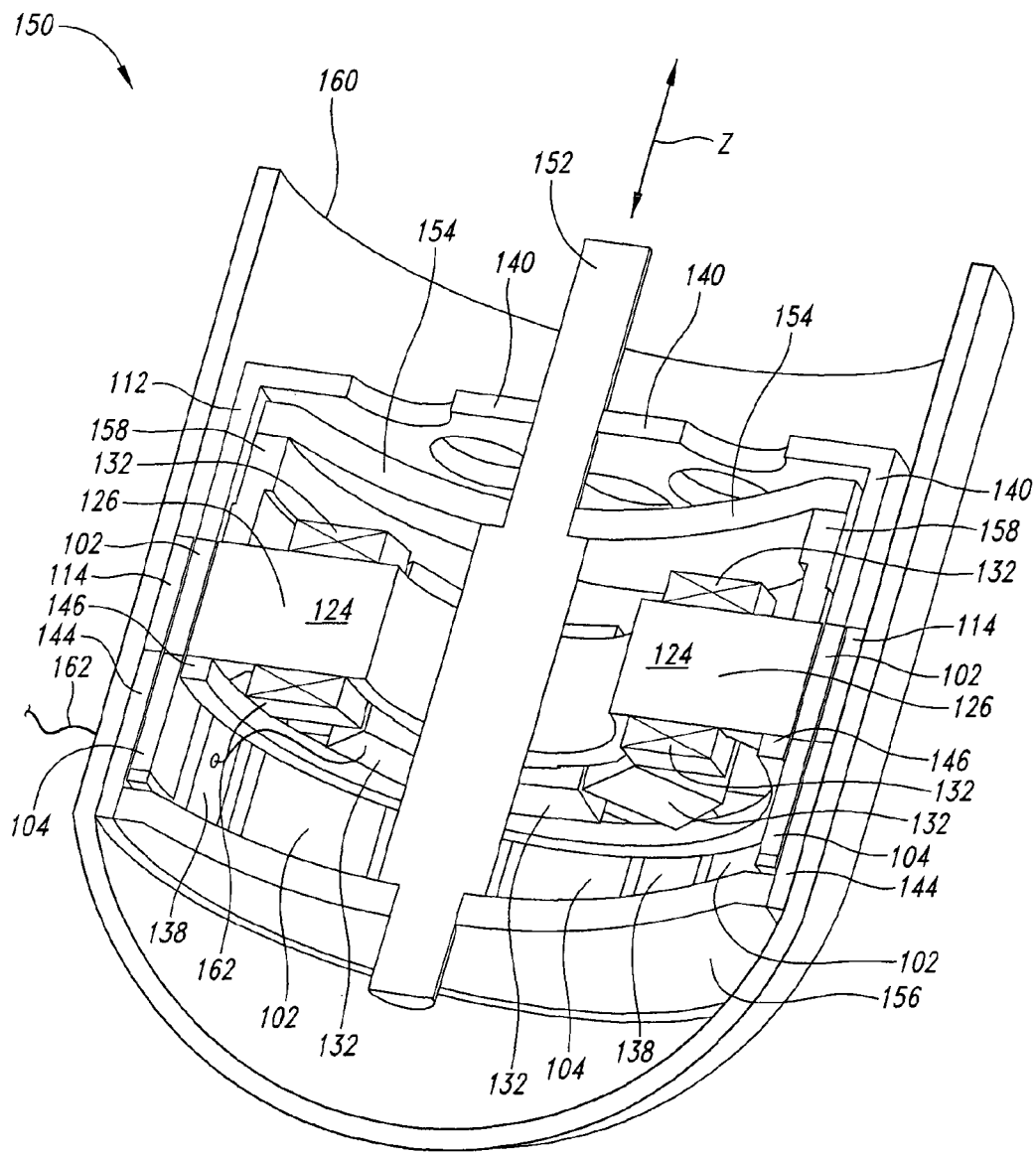
FIG. 12 is an isometric cross-sectional view of FIG. 10 with the slotted mover shown in a second end position.

An exemplary implementation of a linear electrodynamic system 150 is shown in FIGS. 10-12 having the coupler portion 140 of the slotted mover 139 coupled to a shaft 152. FIGS. 10, 11, and 12 show the slotted mover in three positions of its reciprocal movement: a first end position (FIG. 10), a mid-position (FIG. 11), and a second end position (FIG. 12). The shaft 152 is further coupled to an inner flexure bearing 154 and an outer flexure bearing 156 to allow the shaft and the slotted mover 139 to reciprocate along the Z axis shown. The shaft 152 is further coupled to a mechanical system (not shown) to either extract work from the linear electrodynamic system 150 if the linear electrodynamic system is used as a motor or to supply work to the linear electrodynamic system when the linear electrodynamic system is used as an alternator.

The inner flexure bearing 154 is affixed to a cylindrical support member 158, which in turn is affixed to the end portions 128 of the stator poles 124 of the stator assembly 120 configured in this implementation to be concentrically juxtapositioned with the inner surface 113 of the slotted holder portion 137 of the slotted mover 139. The end portions 128 of the stator poles 124 are also shown affixed to the inner stator support portion 146 of the support member 142. The stator member 114 is configured in this implementation for concentric juxtapositioning with the outer surface 112 of the slotted holder portion 137 of the slotted mover 139. The stator member 114 can be affixed to the outer stator support portion 144. The linear electrodynamic system 150 further has a housing 160 that contains its components and can provide structural support. For instance, the housing 160 can be affixed to the support member 142 to be coupled to both the stator member 114 and the stator assembly 120. Furthermore, the housing 160 can serve as a pressure vessel and extend to house a thermodynamic component such as a Stirling cycle engine or cooler coupled with the linear electrodynamic system 150 through the shaft 152. Power lines 162 are shown being routed through the housing 160 to the windings 132 on the stator poles 124.

Figure 13:
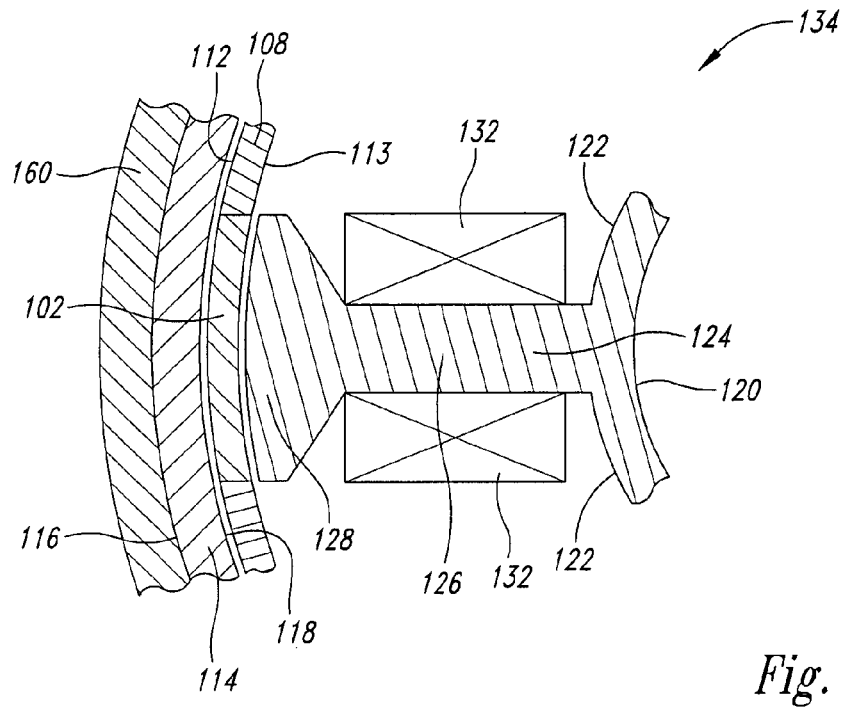
FIG. 13 is an enlarged fragmentary cross-sectional view of the linear electrodynamic assembly of FIG. 5 showing detail of the stator assembly.

A fragmentary cross-sectional view of the linear electrodynamic assembly 134 is depicted in FIG. 13 to show detail regarding shape of the stator pole 124 and how it is joined to the pole support 122. In this case the mid-portion 126 of the stator pole 124 is relatively narrow and is integral with the end portion 128, which is flared. The stator pole 124 also is shown as being integral with the pole support 122.

Figure 14:
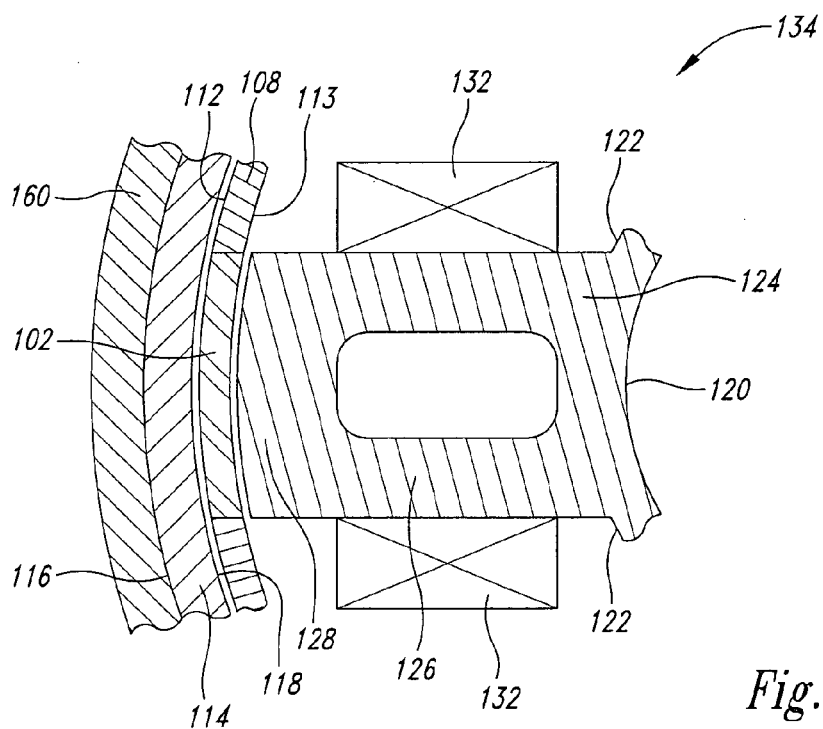
FIG. 14 is an enlarged fragmentary cross-sectional view of a first exemplary alternative linear electrodynamic assembly showing detail of a first exemplary alternative stator assembly.

A fragmentary cross-sectional view of a first exemplary alternative of the linear electrodynamic assembly 134 having a first exemplary alternative of the stator assembly 120 is depicted in FIG. 14 to show detail regarding shape of a first exemplary alternative of the stator pole 124 and how it is joined to the pole support 122. In this case the mid-portion 126 of the stator pole 124 is relatively wide and has a central opening such that the end portion 128 is not flared. The stator pole 124 of this first alternative is shown as being integral with the pole support 122.

Figure 15:
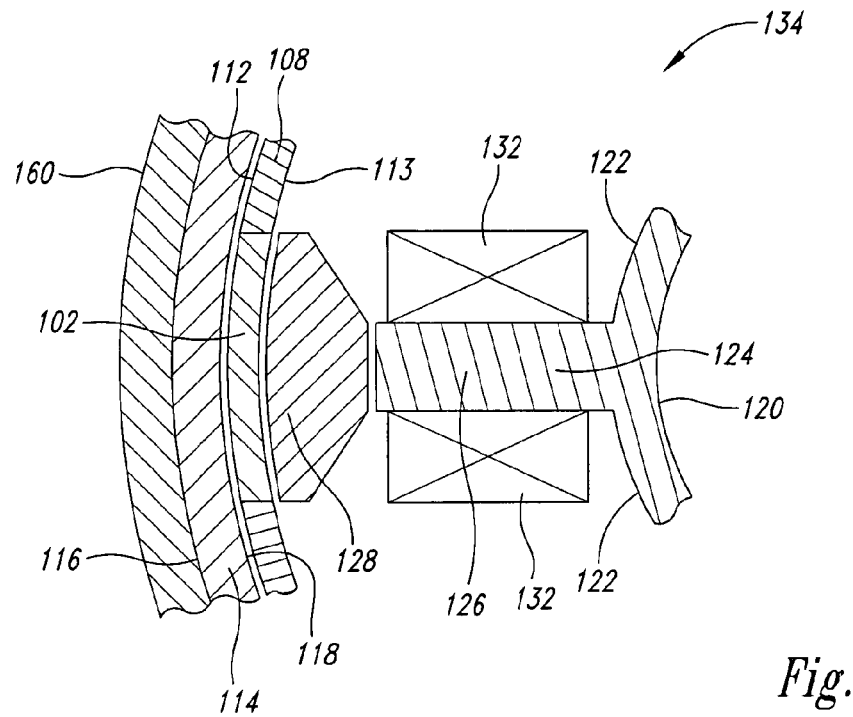
FIG. 15 is an enlarged fragmentary cross-sectional view of a second exemplary alternative linear electrodynamic assembly showing detail of a second exemplary alternative stator assembly.

A fragmentary cross-sectional view of a second exemplary alternative of the linear electrodynamic assembly 134 having a second exemplary alternative of the stator assembly 120 is depicted in FIG. 15 to show detail regarding shape of a second exemplary alternative of the stator pole 124 and how it is joined to the pole support 122. In this case the mid-portion 126 of the stator pole 124 is relatively narrow and is shown as a separate piece from the flared end portion 128. As assembled, the mid-portion 126 and the end portion 128 can either be glued, press fit, or coupled together in other ways. The stator pole 124 of this second alternative is shown as being integral with the pole support 122.

Figure 16:
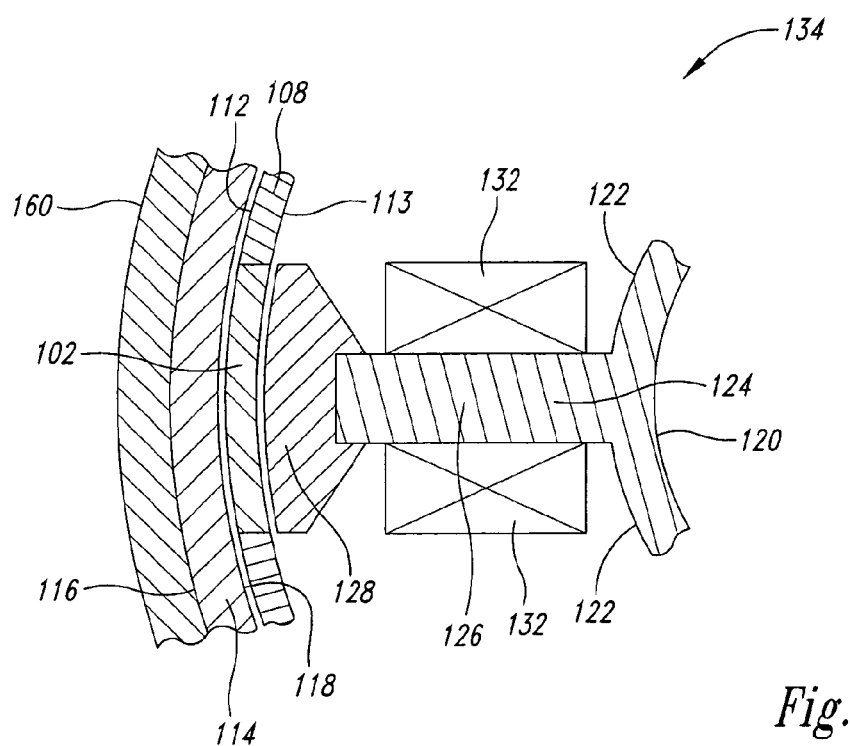
FIG. 16 is an enlarged fragmentary cross-sectional view of a third exemplary alternative linear electrodynamic assembly showing detail of a third exemplary alternative stator assembly.

A fragmentary cross-sectional view of a third exemplary alternative of the linear electrodynamic assembly 134 having a third exemplary alternative of the stator assembly 120 is depicted in FIG. 16 to show detail regarding shape of a third exemplary alternative of the stator pole 124 and how it is joined to the pole support 122. In this case the mid-portion 126 of the stator pole 124 is relatively narrow and is shown as a separate piece from, and is inserted into, the flared end portion 128. In assembly the mid-portion 126 and the end portion 128 can either be glued, press fit, or coupled together in other ways. The stator pole 124 of this third alternative is shown as being integral with the pole support 122.

Figure 17:
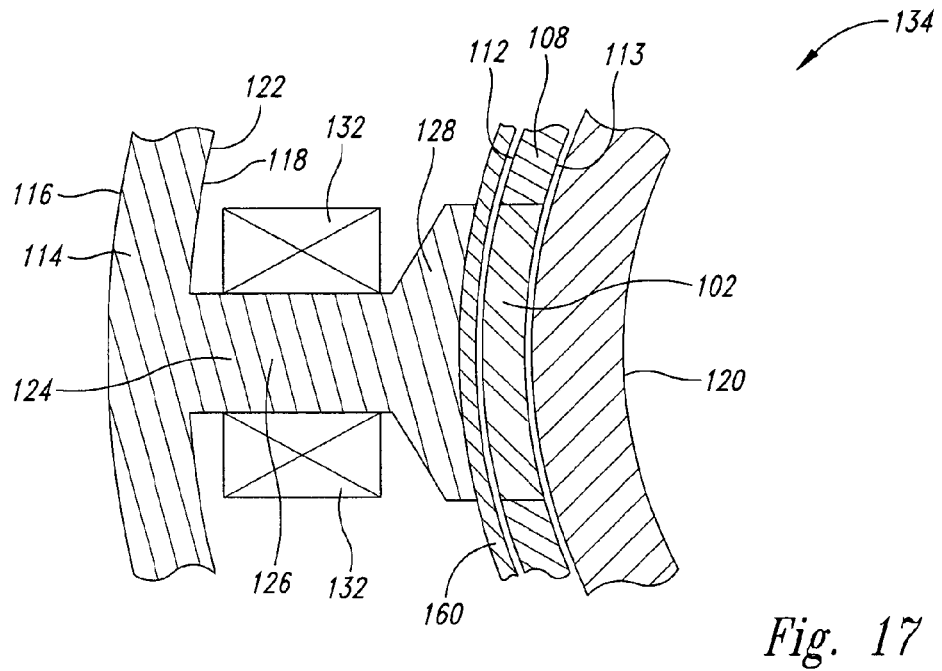
FIG. 17 is an enlarged fragmentary cross-sectional view of a fourth exemplary alternative linear electrodynamic assembly showing detail of a fourth exemplary alternative stator assembly and a first exemplary alternative stator member.

A fragmentary cross-sectional view of a fourth exemplary alternative of the linear electrodynamic assembly 134 having a fourth exemplary alternative of the stator assembly 120 and a first exemplary alternative of the stator member 114 is depicted in FIG. 17 including detail regarding shape of a fourth exemplary alternative of the stator pole 124 and how it is joined to the pole support 122. In this case the mid-portion 126 of the stator pole 124 is relatively narrow and is integral with the flared end portion 128 and the pole support 122. The stator assembly 120 is configured to position the end surfaces 130 of the stator poles 124 to be external to the housing 160. The housing 160 is juxtapositioned between the stator assembly 120 and the outer surface 112 of the holder portion 108 of the magnet assembly 106. In this implementation, since the stator poles 124 are external to the housing 160, assembly and maintenance issues may be lessened. The stator member 114 is positioned to be adjacent the inner surface 113 of the holder portion 108 of the magnet assembly 106.

Figure 18:
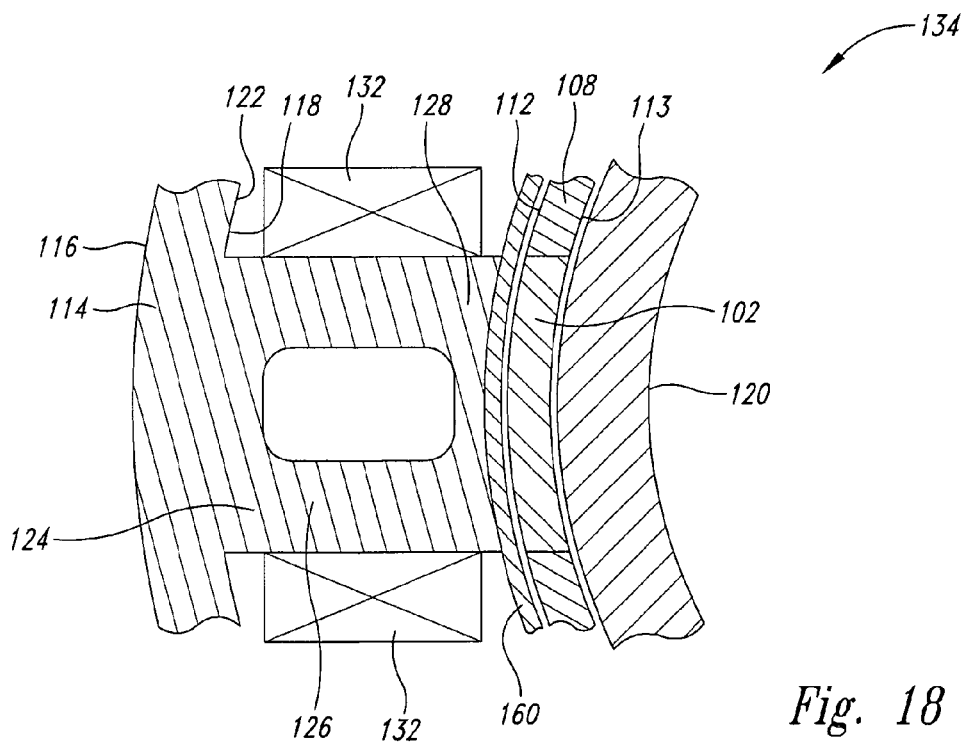
FIG. 18 is an enlarged fragmentary cross-sectional view of a fifth exemplary alternative linear electrodynamic assembly showing detail of a fifth exemplary alternative stator assembly and the first exemplary alternative stator member.

A fragmentary cross-sectional view of a fifth exemplary alternative of the linear electrodynamic assembly 134 having a fifth exemplary alternative of the stator assembly 120 and the first exemplary alternative of the stator member 114 is depicted in FIG. 18 including detail regarding shape of a fifth exemplary alternative of the stator pole 124 and how it is joined to the pole support 122. In this case the mid-portion 126 of the stator pole 124 is relatively wide with a central opening and is integral with the non-flared end portion 128 and the pole support 122. The stator assembly 120 is configured to position the end surfaces 130 of the stator poles 124 adjacent the housing 160 and facing the outer surface 112 of the holder portion 108 of the magnet assembly 106. The stator member 114 is positioned to be adjacent the inner surface 113 of the holder portion 108 of the magnet assembly 106.

Figure 19:
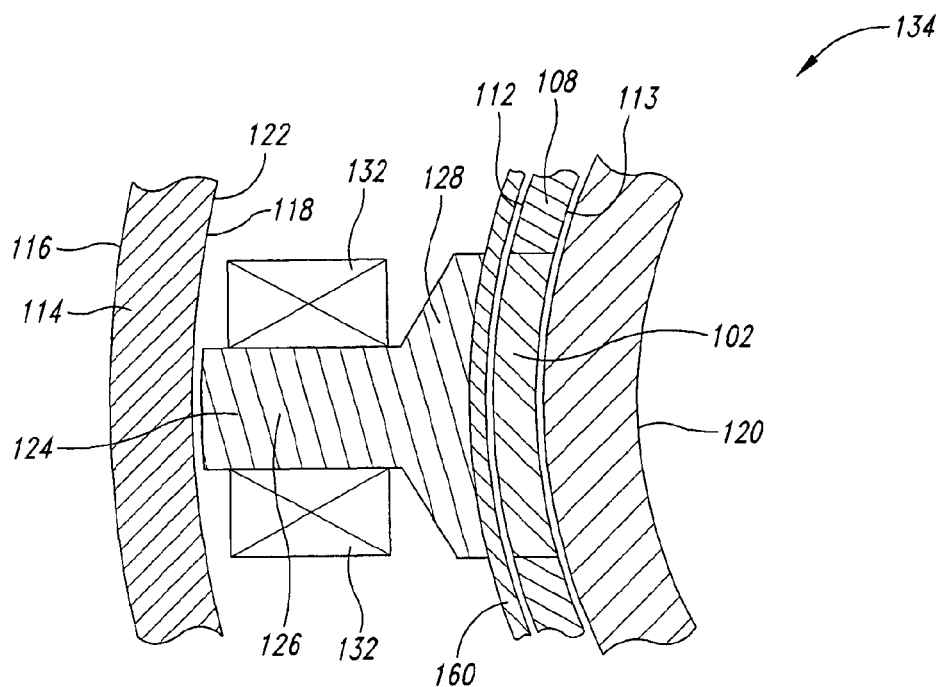
FIG. 19 is an enlarged fragmentary cross-sectional view of a sixth exemplary alternative linear electrodynamic assembly showing detail of a sixth exemplary alternative stator assembly and the first exemplary alternative stator member.

A fragmentary cross-sectional view of a sixth exemplary alternative of the linear electrodynamic assembly 134 having a sixth exemplary alternative of the stator assembly 120 and the first exemplary alternative of the stator member 114 is depicted in FIG. 19 including detail regarding shape of a sixth exemplary alternative of the stator pole 124 and how it is joined to the pole support 122. In this case the mid-portion 126 of the stator pole 124 is relatively narrow and is integral with the flared end portion 128, but is shown as a separate piece from the pole support 122. As assembled, the mid-portion 126 could be glued, press fit, or otherwise coupled together with the pole support 122. The stator assembly 120 is configured to position the end surfaces 130 of the stator poles 124 adjacent the housing 160 and facing the outer surface 112 of the holder portion 108 of the magnet assembly 106. The stator member 114 is positioned to be adjacent the inner surface 113 of the holder portion 108 of the magnet assembly 106.

Figure 20:
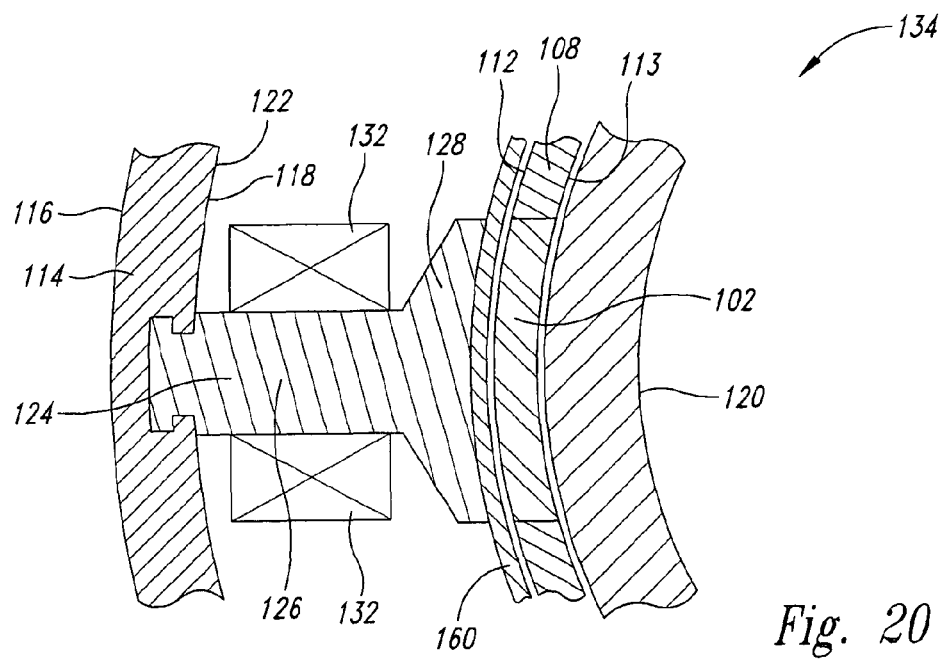
FIG. 20 is an enlarged fragmentary cross-sectional view of a seventh exemplary alternative linear electrodynamic assembly showing detail of a seventh exemplary alternative stator assembly and the first exemplary alternative stator member.

A fragmentary cross-sectional view of a seventh exemplary alternative of the linear electrodynamic assembly 134 having a seventh exemplary alternative of the stator assembly 120 and the first exemplary alternative of the stator member 114 is depicted in FIG. 20 including detail regarding shape of a seventh exemplary alternative of the stator pole 124 and how it is joined to the pole support 122. In this case the mid-portion 126 of the stator pole 124 is relatively narrow and is integral with the flared end portion 128, but is shown as a separate piece from the pole support 122. As assembled, the mid-portion 126 uses a key and keyway with the pole support 122 as shown in FIG. 20. The stator assembly 120 is configured to position the end surfaces 130 of the stator poles 124 adjacent the housing 160 and facing the outer surface 112 of the holder portion 108 of the magnet assembly 106. The stator member 114 is positioned to be adjacent the inner surface 113 of the holder portion 108 of the magnet assembly 106.

Figure 21:
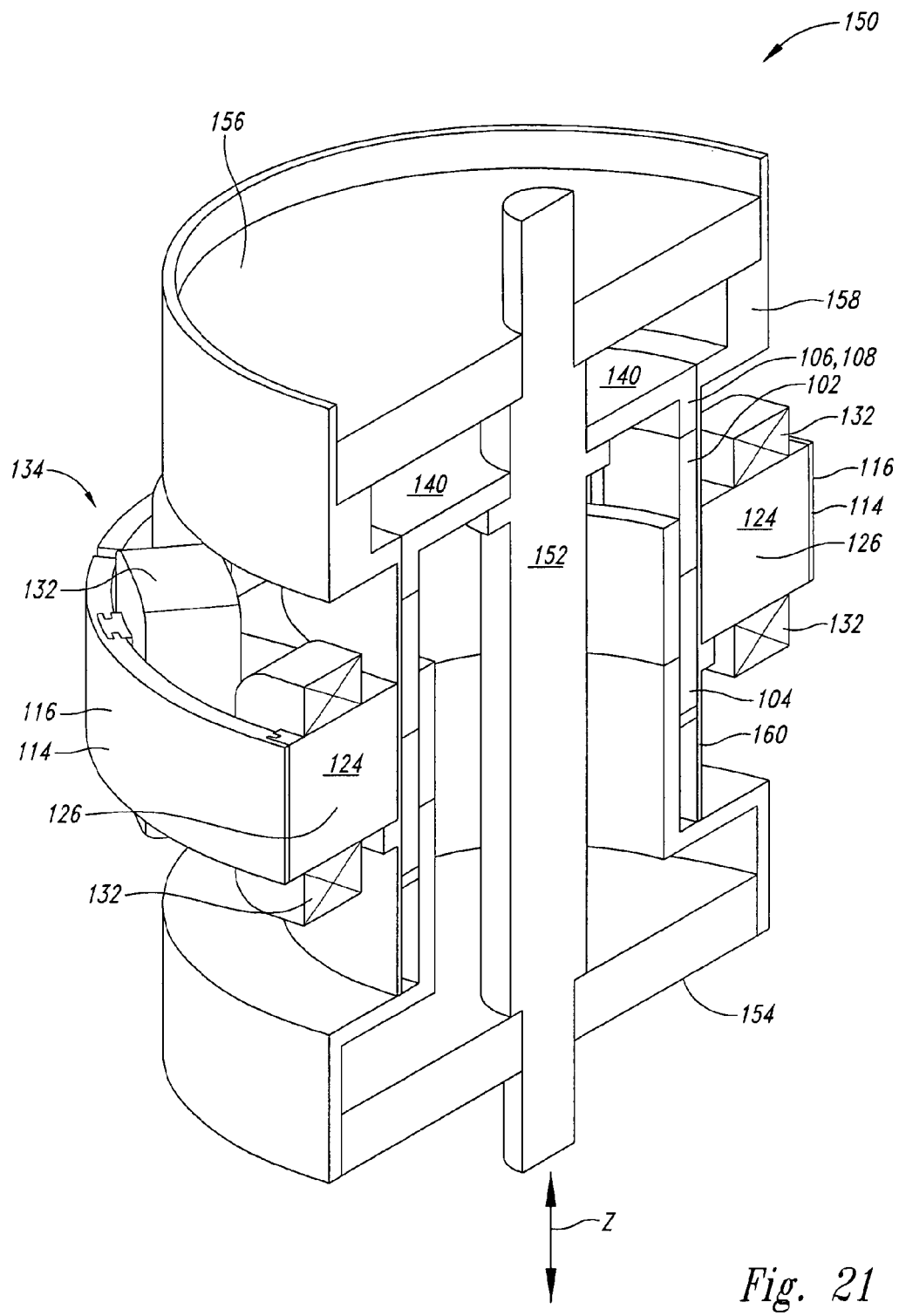
FIG. 21 is a cross-sectional isometric view of a first exemplary alternative linear electrodynamic system including the seventh alternative linear electrodynamic assembly.
Figure 21A:
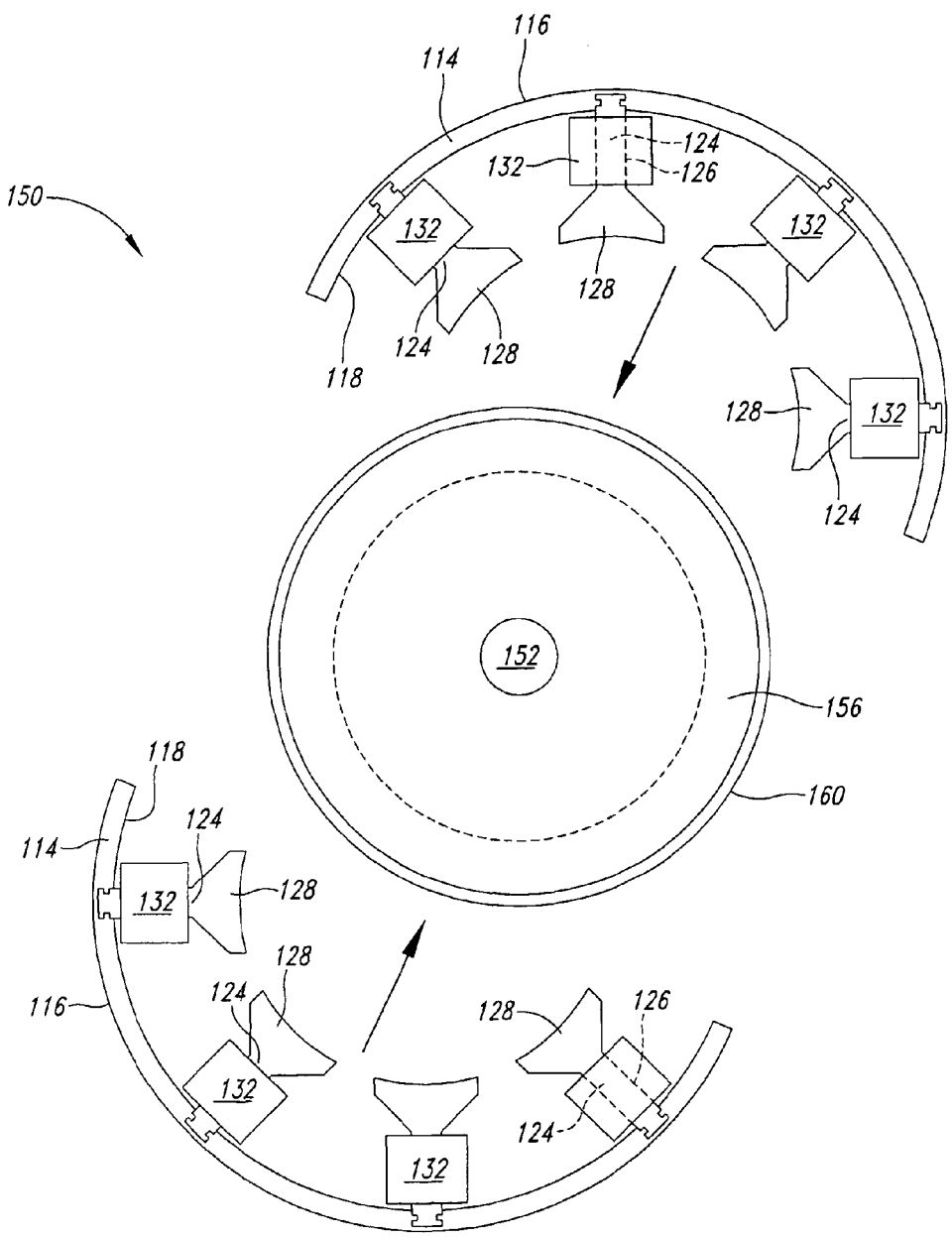
FIG. 21A is schematic end view of the first alternative linear electrodynamic system showing assembly detail.

An isometric view of an exemplary alternative implementation of the linear electrodynamic system 150 using the seventh exemplary alternative of the electrodynamic assembly 134 is shown in FIG. 21. Since this implementation uses the magnet assembly 106, which is not slotted, the housing 160 is used to tie the outer stator support portion 144 to the inner stator support portion 146. The stator member 116 is shown in FIG. 21A in two sections, which are press fit together during assembly.

Figure 22:
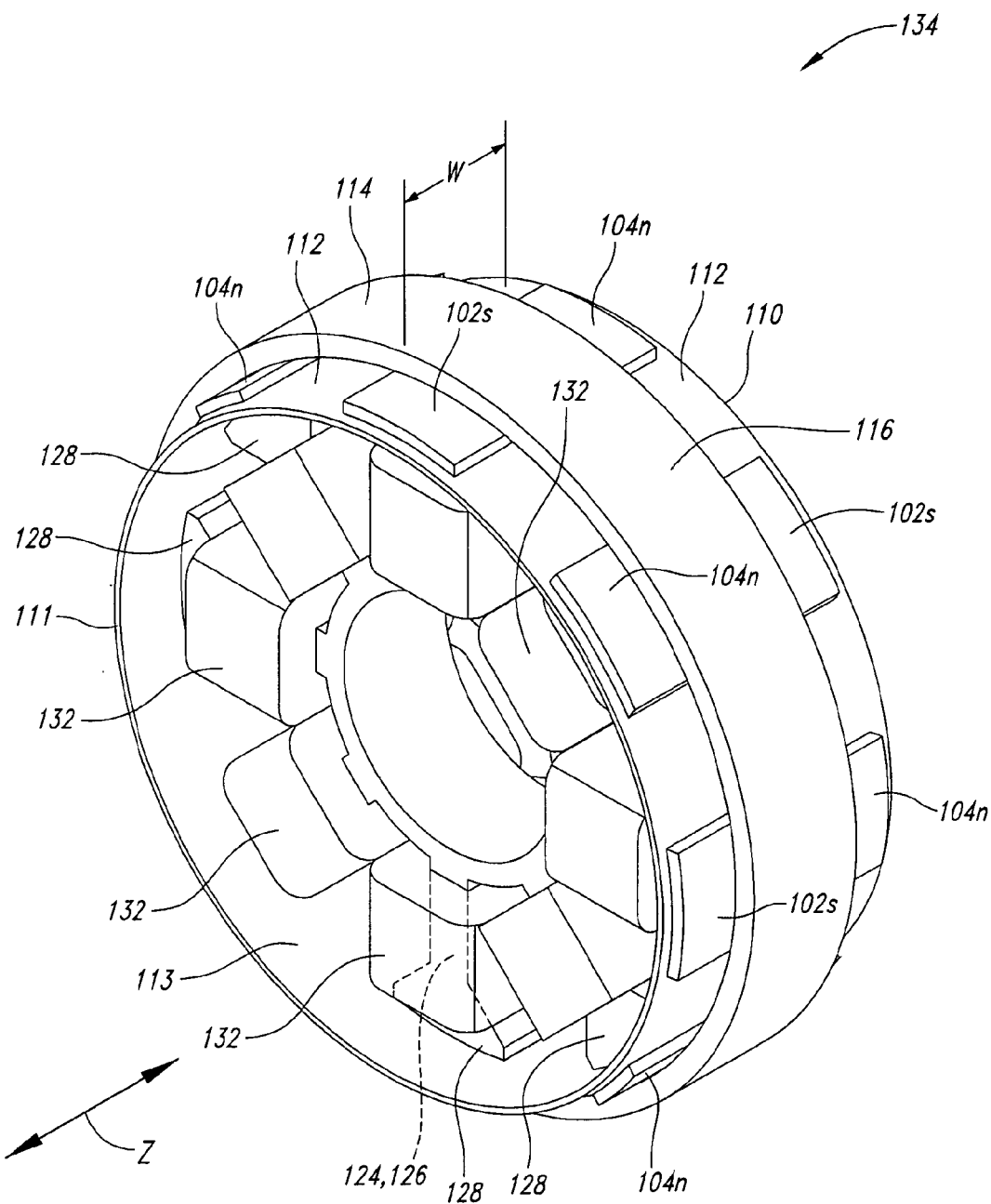
FIG. 22 is an isometric view of second exemplary version of the linear electrodynamic assembly of FIG. 5 having a second exemplary non-recessed version of the magnet assembly of FIG. 2.
Figure 23:
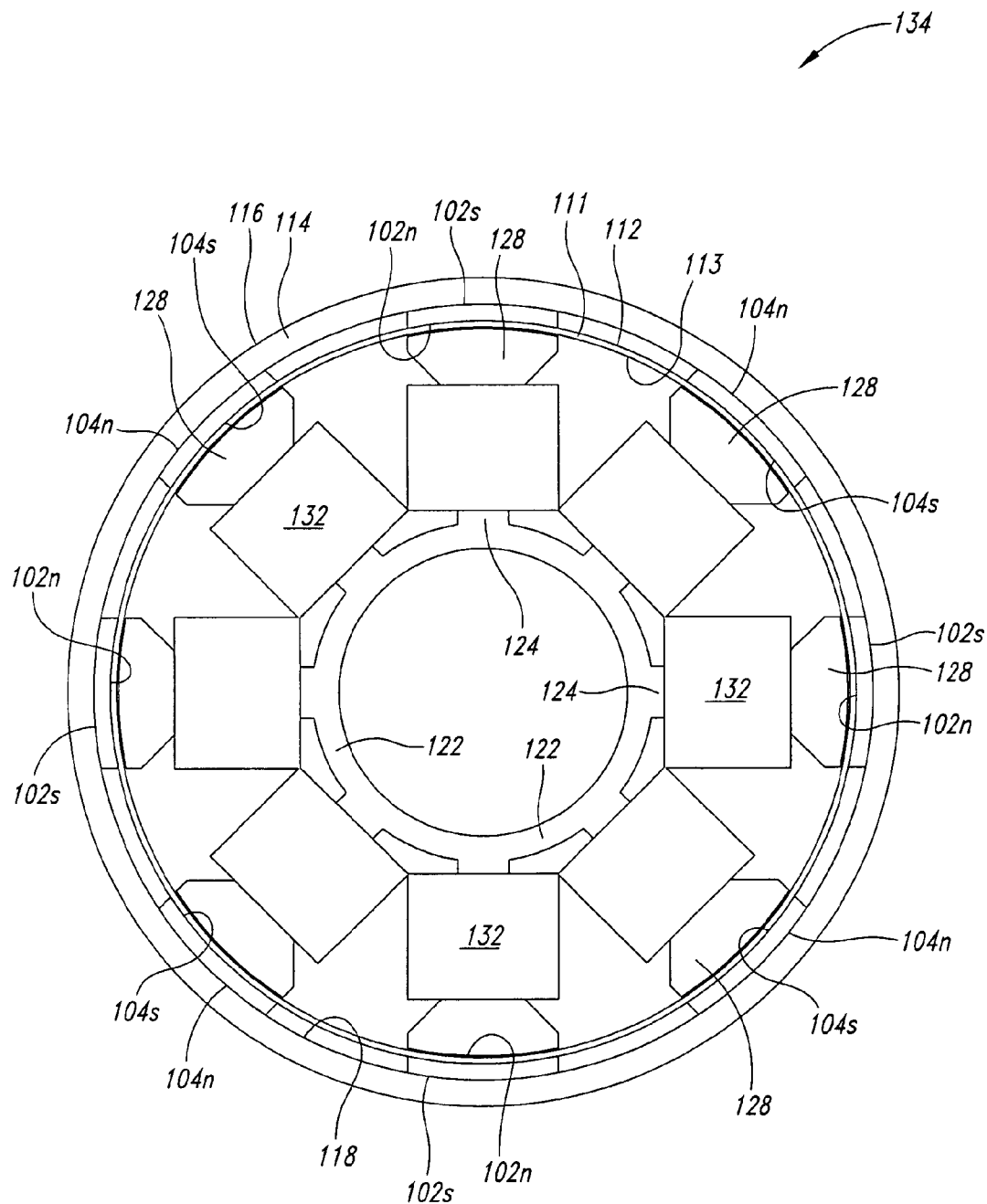
FIG. 23 is an end view of the second version of the linear electrodynamic assembly shown in FIG. 22.

A second exemplary version of the linear electrodynamic assembly 134 is shown in FIGS. 22 and 23 as having a second exemplary version of the magnet assembly 106 in which the first magnet 102 and the second magnet 104 are affixed to the outer surface 112 of the holder portion 108. The stator member 114 is so sized to accommodate for additional dimensional thickness of the magnet assembly 106 caused by this positioning of the first magnet 102 and the second magnet 104. In other implementations the magnet pairs 100 can be affixed to the inner surface 113 of the holder portion 108.

Figure 24:
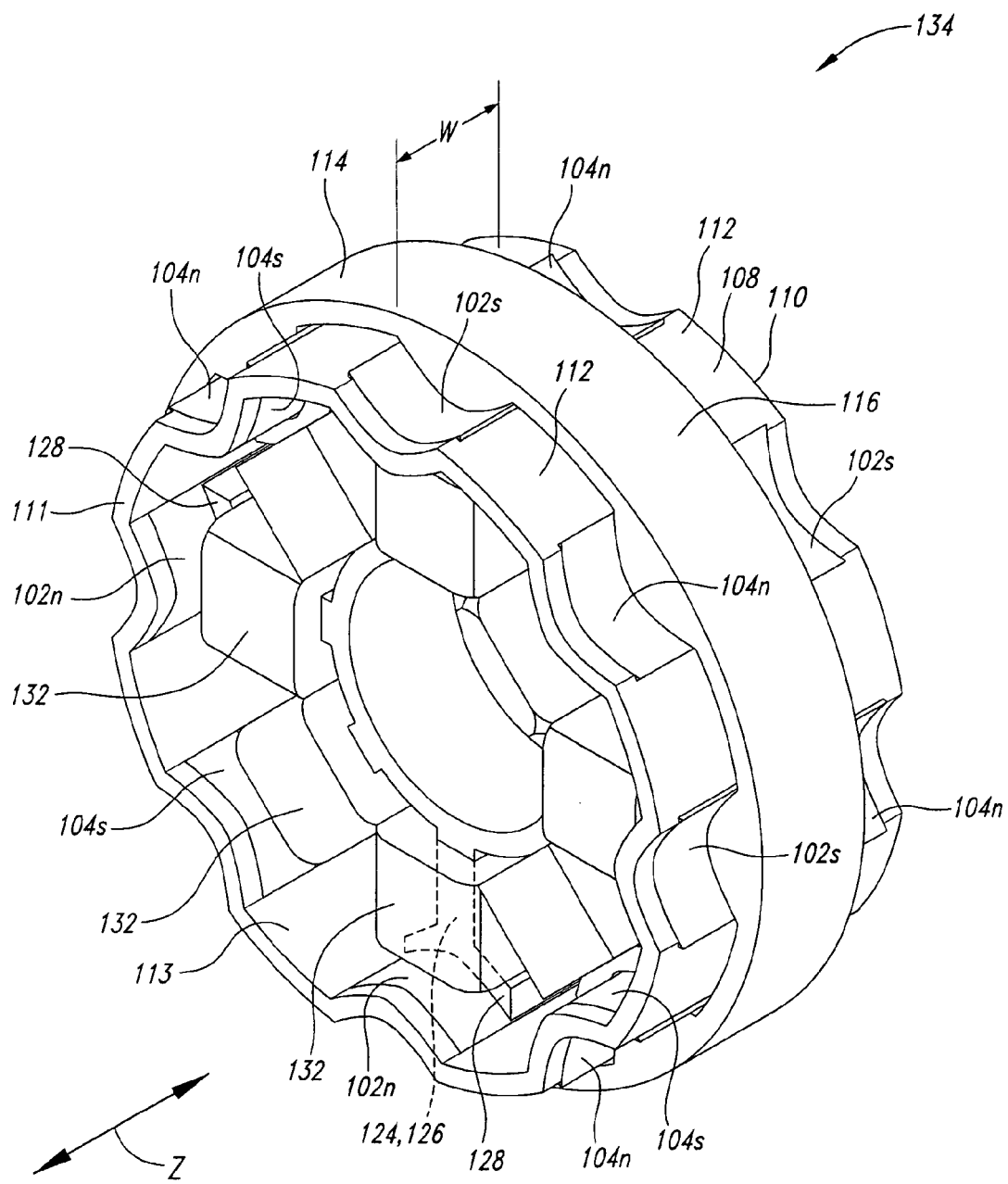
FIG. 24 is an isometric view of an eighth exemplary alternative linear electrodynamic assembly having an eighth exemplary alternative stator assembly and a second exemplary alternative stator member.
Figure 25:
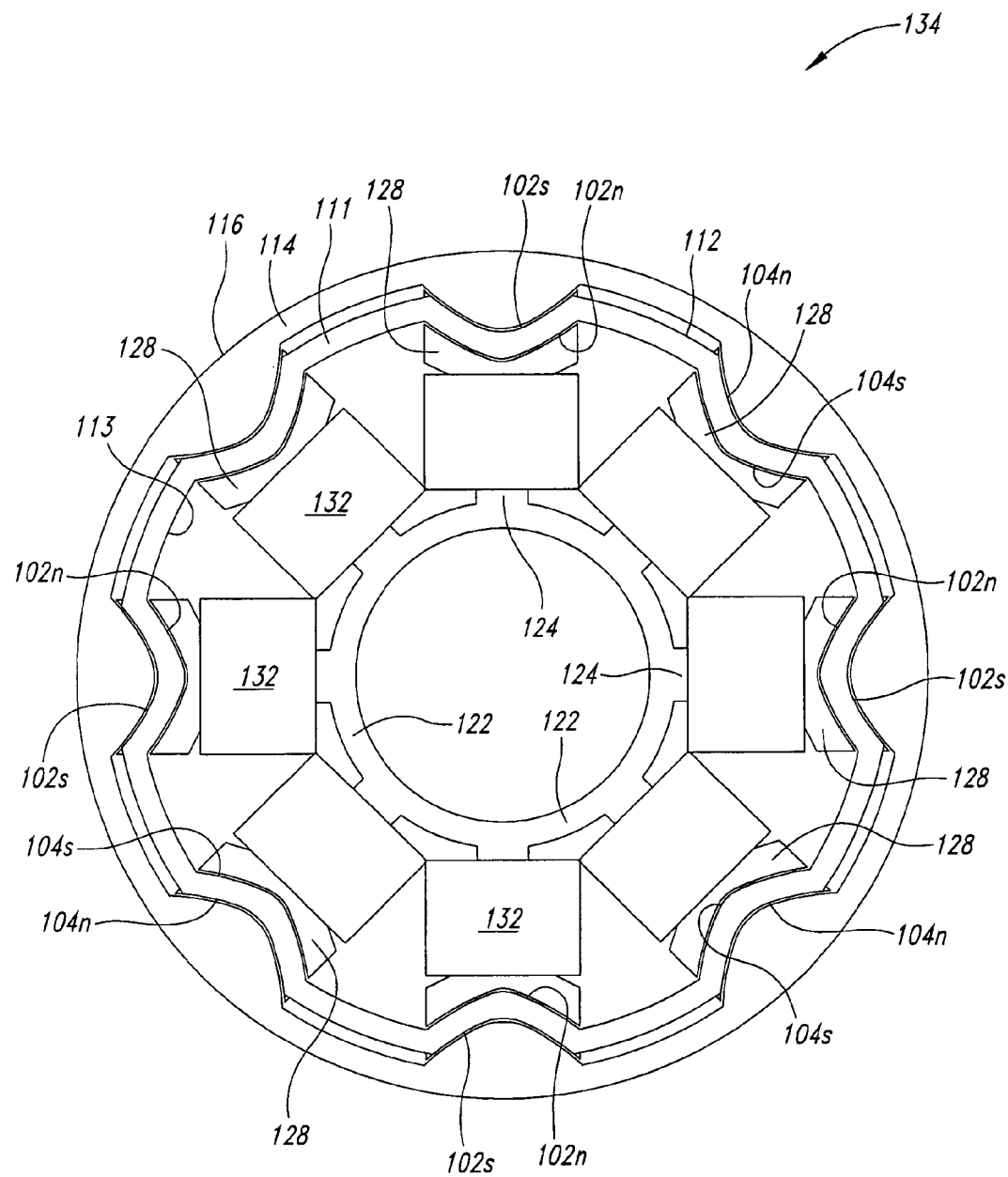
FIG. 25 is an end plan view of the eighth alternative linear electrodynamic assembly shown in FIG. 24

An eighth exemplary alternative of the linear electrodynamic assembly 134 is shown in FIGS. 24 and 25 with an eighth exemplary alternative of the stator assembly 120 and a second exemplary alternative of the stator member 114. In this implementation the end surfaces 130 of the stator poles 124 are concave. Portions of the inner surface 118 of the stator member 114 are convex that are adjacent the first magnets 102 and the second magnets 104. To accommodate this shaping of the stator poles 124 and the stator member 114, the first magnets 102, the second magnets 104, and portions of the holder portion 108 have convex surfaces adjacent the stator poles and concave surfaces adjacent the stator member. The size of the radii of curvature of these surfaces are varied for different implementations.

Figure 26:
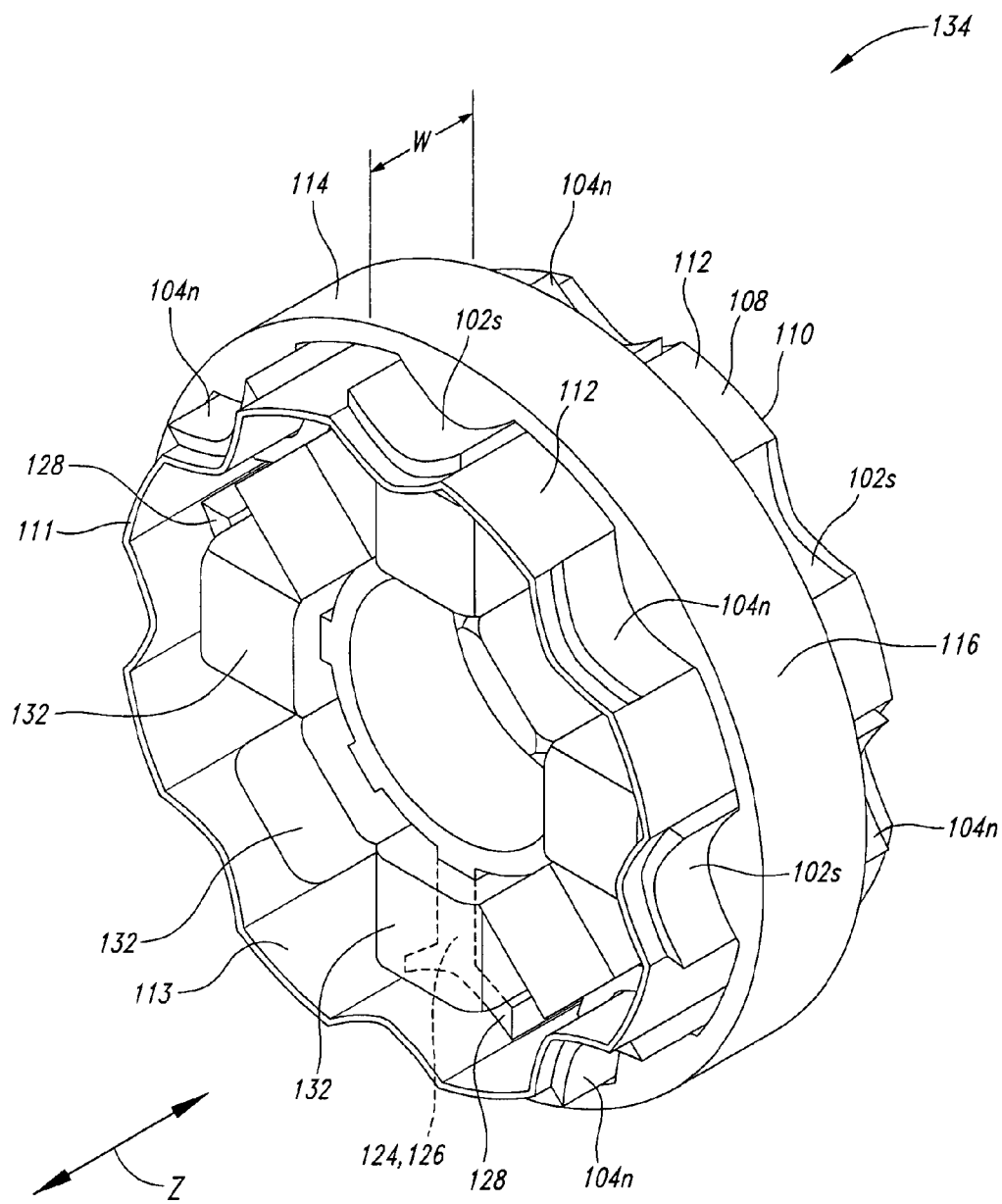
FIG. 26 is an isometric view of a second exemplary version of the eighth alternative linear electrodynamic assembly shown in FIGS. 24 and 25.
Figure 27:
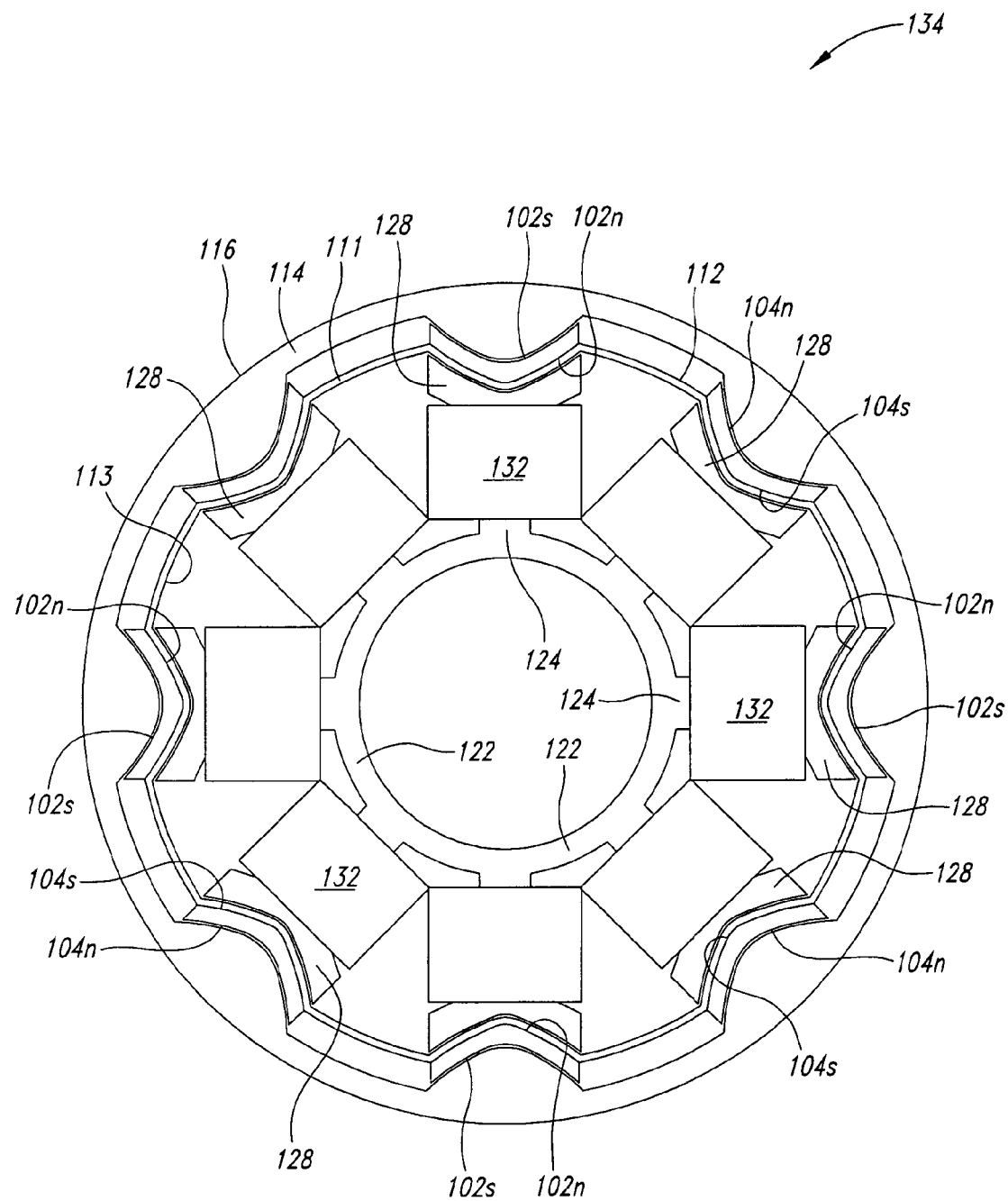
FIG. 27 is an end plan view of the second version of the eighth alternative linear electrodynamic assembly of FIG. 26.

A second exemplary version of the eighth linear electrodynamic assembly 134 is shown in FIGS. 26 and 27 in which the first magnets 102 and the second magnets 104 are affixed to the outer surface 112 of the holder portion 108.

Figure 28:
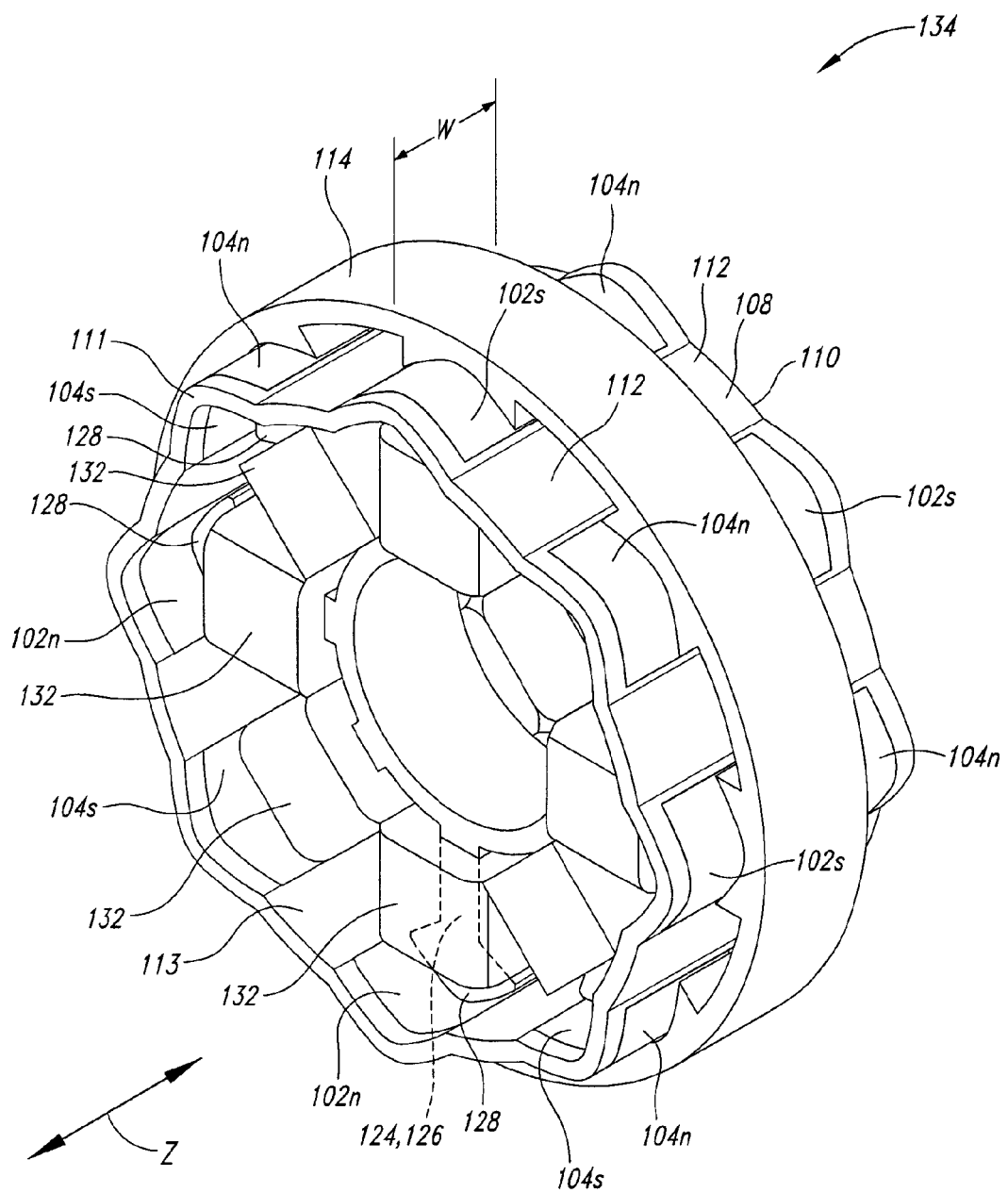
FIG. 28 is an isometric view of a ninth exemplary alternative linear electrodynamic assembly having a ninth exemplary alternative stator assembly and a third exemplary alternative stator member.
Figure 29:
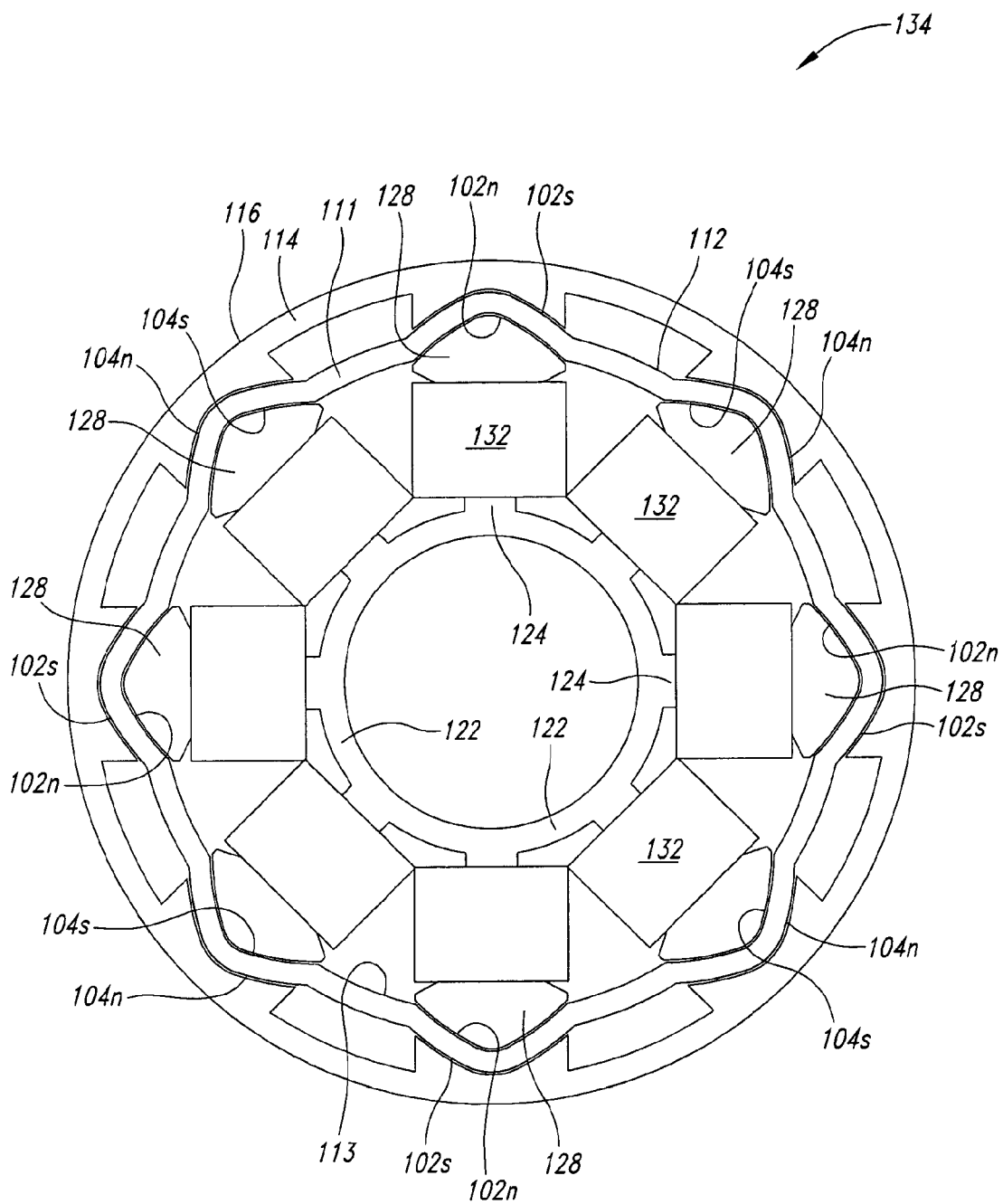
FIG. 29 is an end view of the ninth alternative linear electrodynamic assembly shown in FIG. 28.

A ninth exemplary alternative of the linear electrodynamic assembly 134 is shown in FIGS. 28 and 29 with a ninth exemplary alternative of the stator assembly 120 and a third exemplary alternative of the stator member 114. Here the end surfaces 130 of the stator poles 124 are convex. Portions of the inner surface 118 of the stator member 114 are concave that are adjacent the first magnets 102 and the second magnets 104. To accommodate this shaping of the stator poles 124 and the stator member 114, the first magnets 102, the second magnets 104, and portions of the holder portion 108 have concave surfaces adjacent the stator poles and convex surfaces adjacent the stator member. The concave surfaces have radii of curvature that are smaller than those of the holder portion 108 and the magnet pairs 100 in the first implementation shown in FIG. 2.

Figure 30:
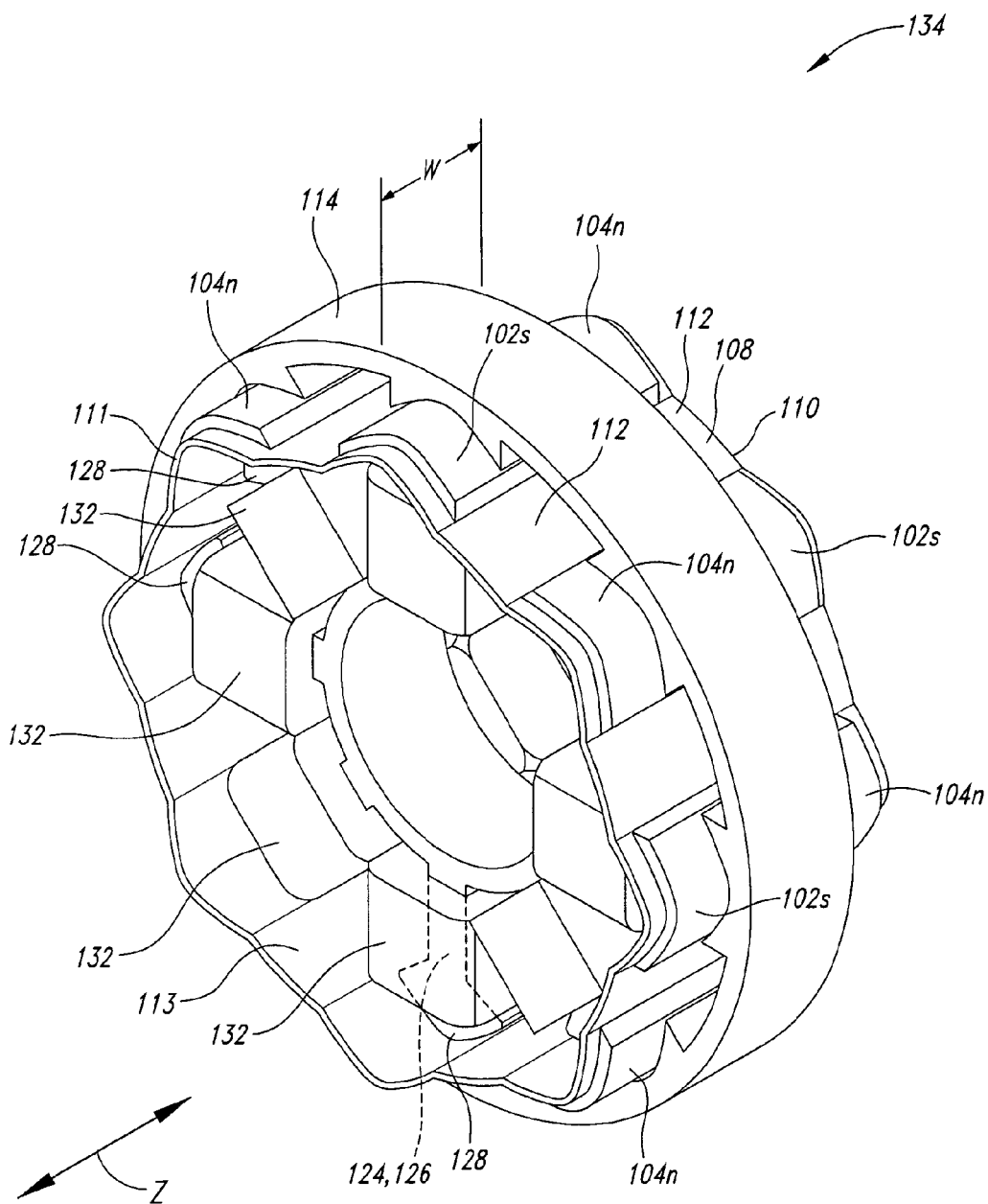
FIG. 30 is an isometric view of a second exemplary version of the ninth alternative linear electrodynamic assembly shown in FIGS. 28 and 29.
Figure 31:
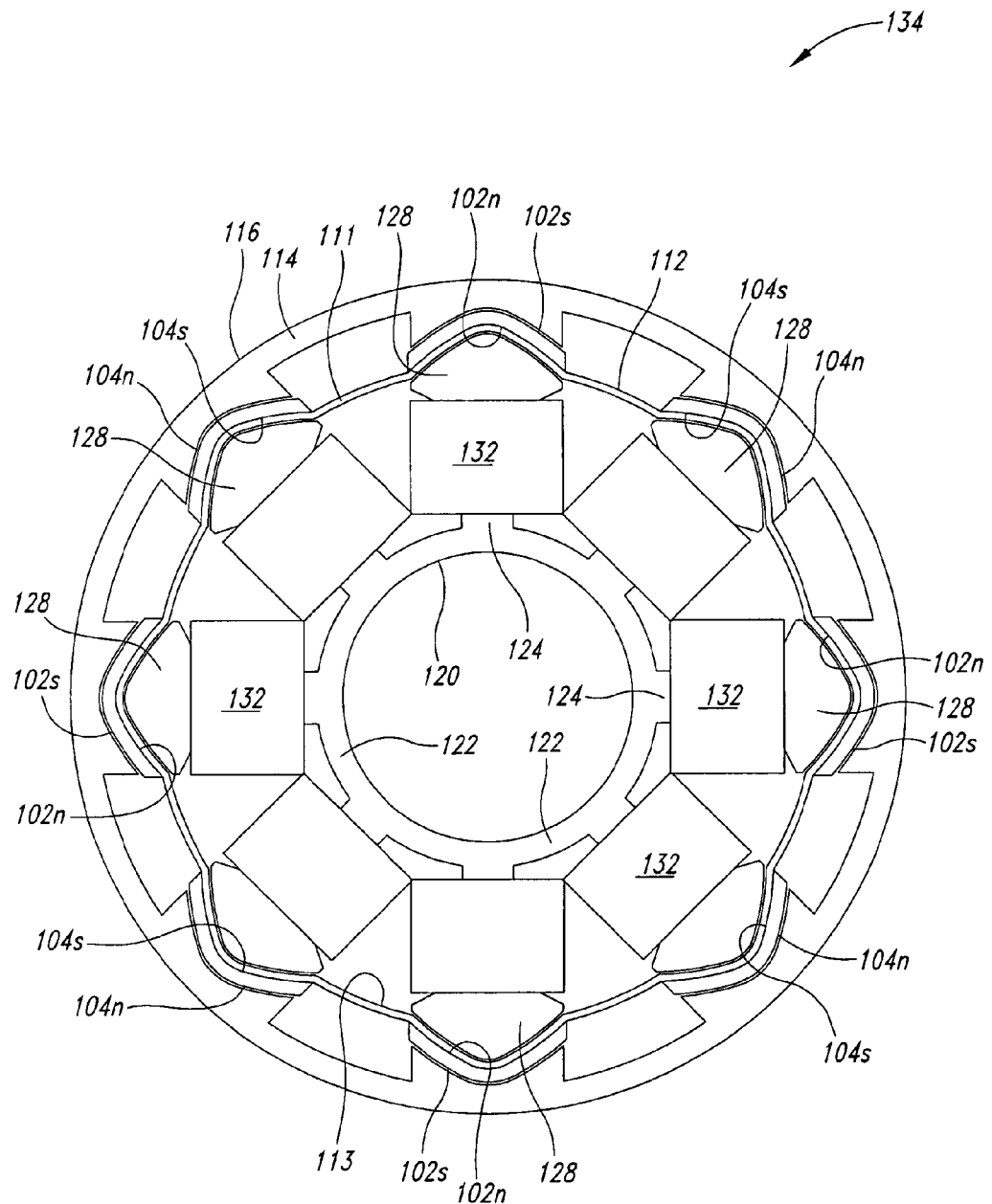
FIG. 31 is an end view of the second exemplary version of the ninth alternative linear electrodynamic assembly of FIG. 30.

A second exemplary version of the ninth alternative linear electrodynamic assembly 134 is shown in FIGS. 30 and 31 in which the first magnets 102 and the second magnets 104 are affixed to the outer surface 112 of the holder portion 108.

Figure 32:
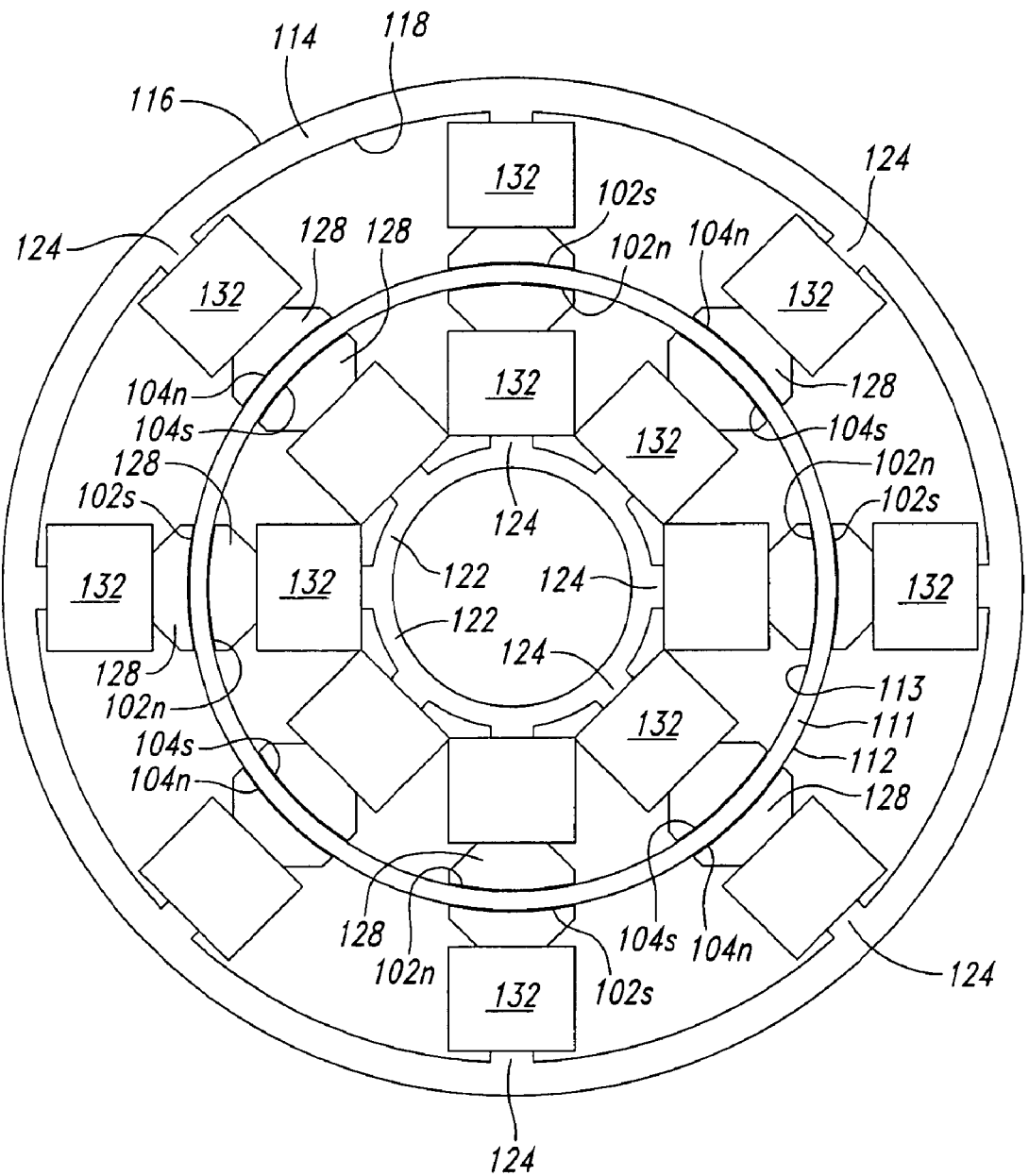
FIG. 32 is an end view of a tenth exemplary alternative linear electrodynamic assembly including the fourth alternative stator assembly shown in FIG. 17, the stator assembly shown in FIG. 4, and the magnet assembly shown in FIG. 2, and without a stator member.

A tenth exemplary alternative of the linear electrodynamic assembly 134 is shown in FIG. 32 as using the magnet assembly 106 shown in FIG. 2 and the stator assembly 120 shown in FIG. 4. Furthermore, the fourth alternative stator assembly of FIG. 17 is used instead of using the stator member 114. Other implementations may use other alternatives of the stator assembly 120 and the magnet assembly 106.

Figure 33:
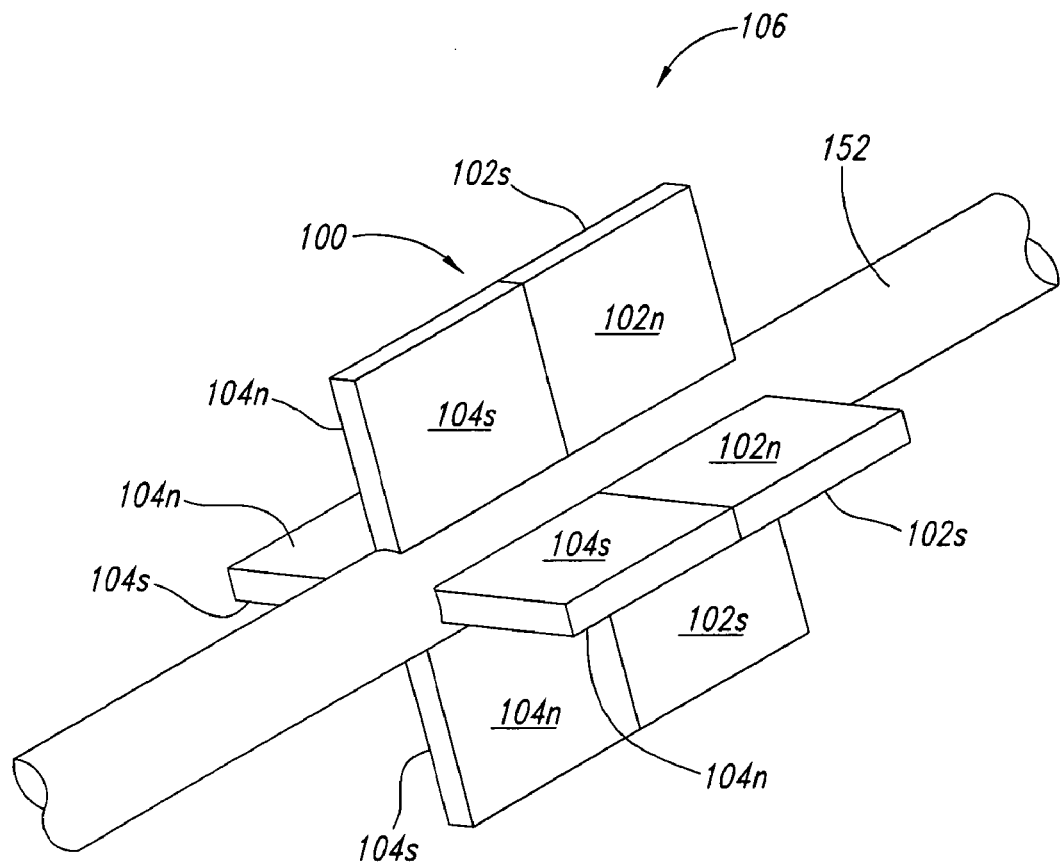
FIG. 33 is an isometric view of a fourth exemplary alternative magnet assembly.

A fourth exemplary alternative of the magnet assembly 106 is shown in FIG. 33 as having the magnet pairs 100 affixed directly to the shaft 152. The magnet pairs 100 are arranged on the shaft 152 in an X pattern since there are four of the magnet pairs 100 used with each adjacent two of the magnet pairs forming a V pattern. In other implementations other numbers of the magnet pairs 100 are used for other patterns.

Figure 34:
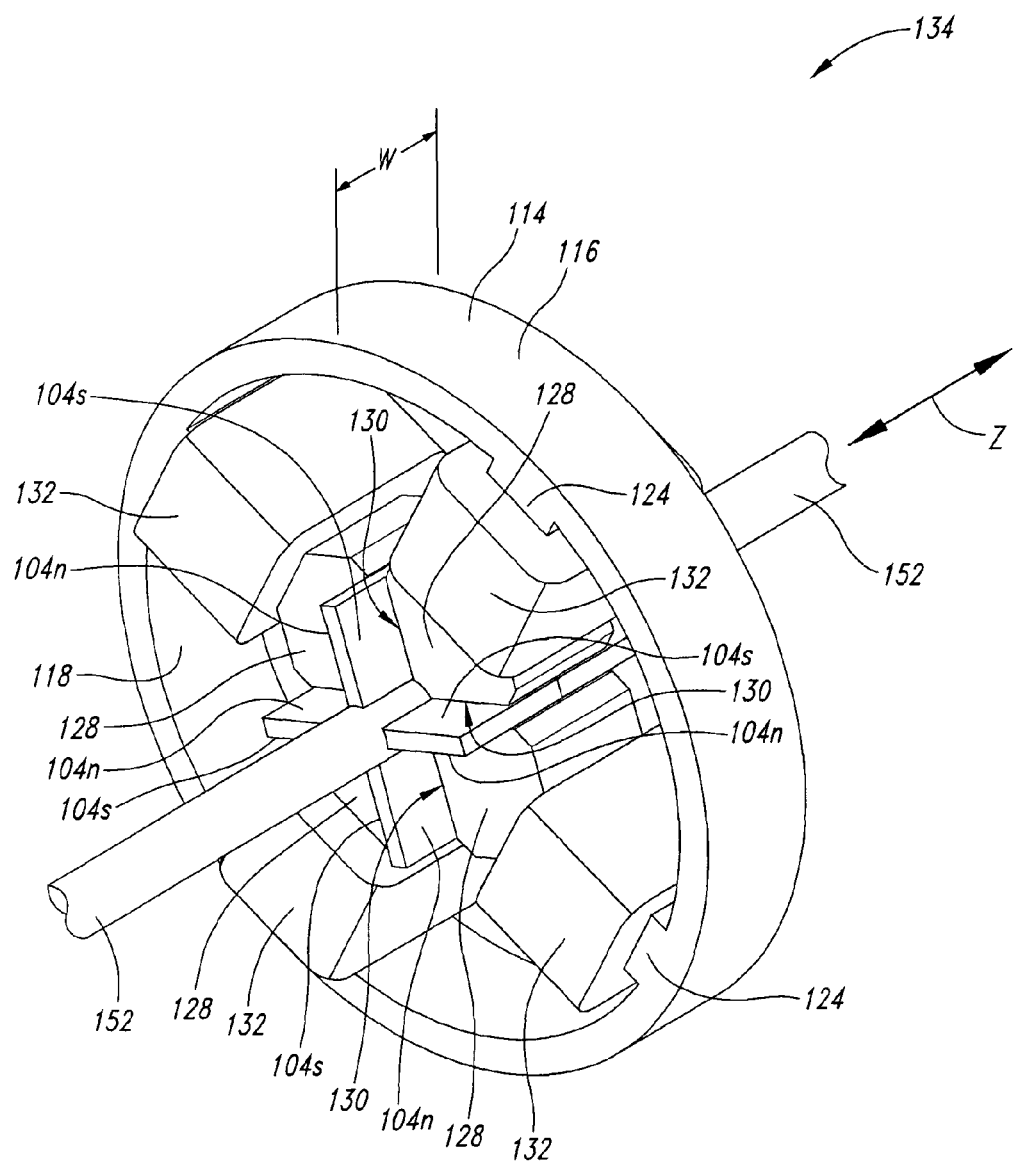
FIG. 34 is an isometric view of an eleventh exemplary alternative linear electrodynamic assembly including the fourth alternative magnet assembly of FIG. 33 and a tenth exemplary alternative stator assembly.
Figure 35:
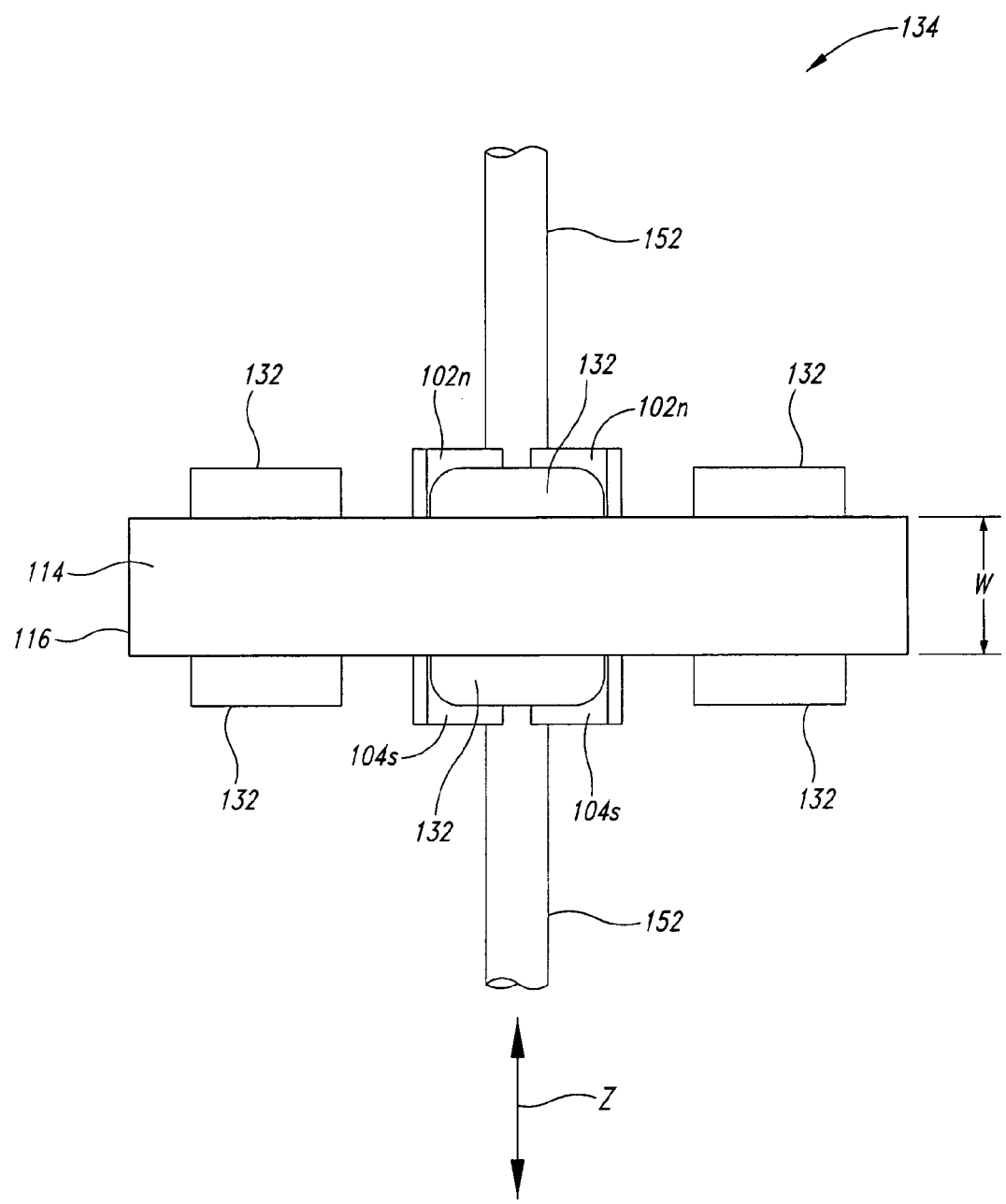
FIG. 35 is an elevational side from a first side position of the eleventh alternative linear electrodynamic assembly of FIG. 34 showing positioning of magnets.
Figure 36:
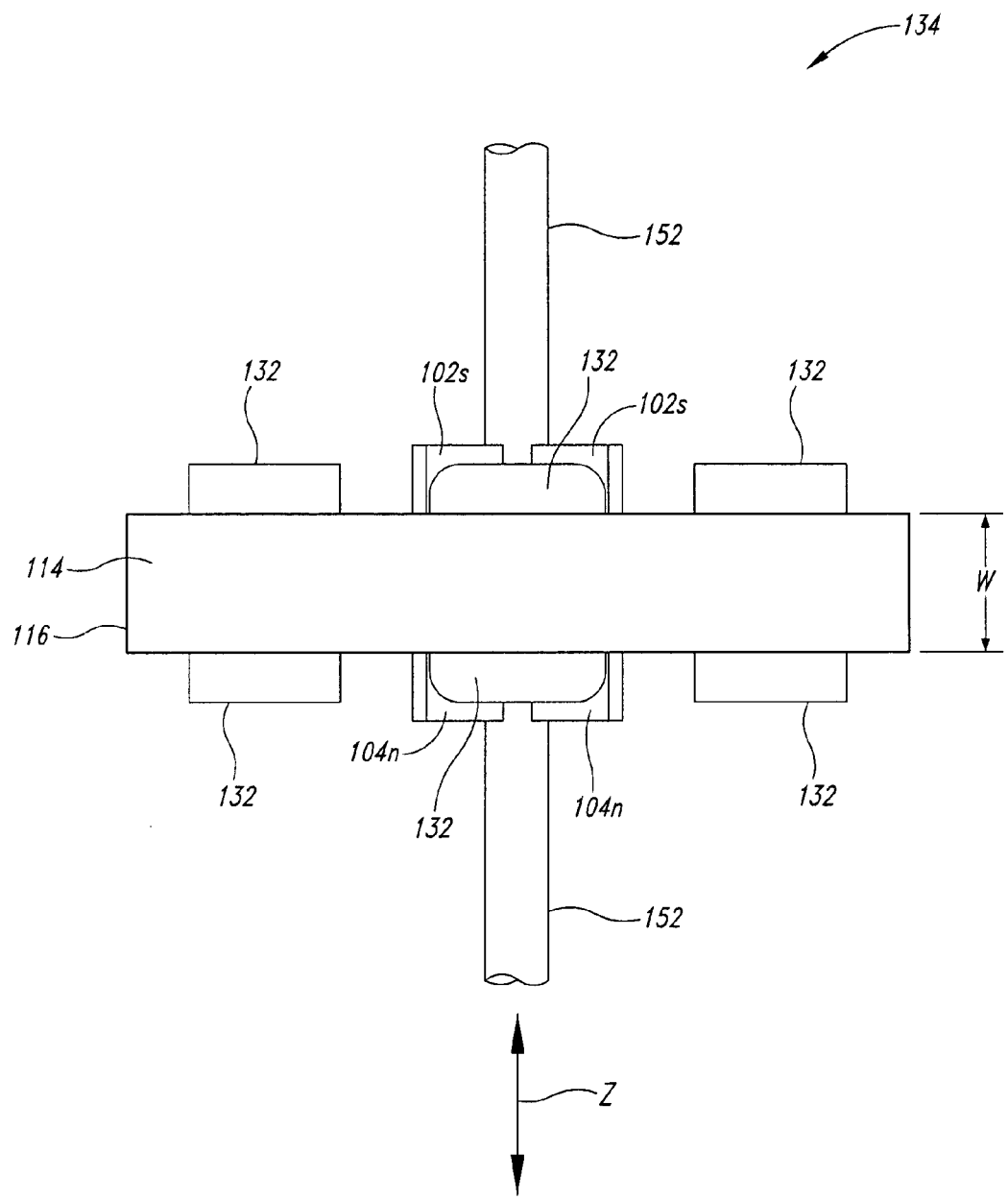
FIG. 36 is an elevational side from a second side position of the eleventh alternative linear electrodynamic assembly of FIG. 34 showing positioning of magnets.
Figure 37:
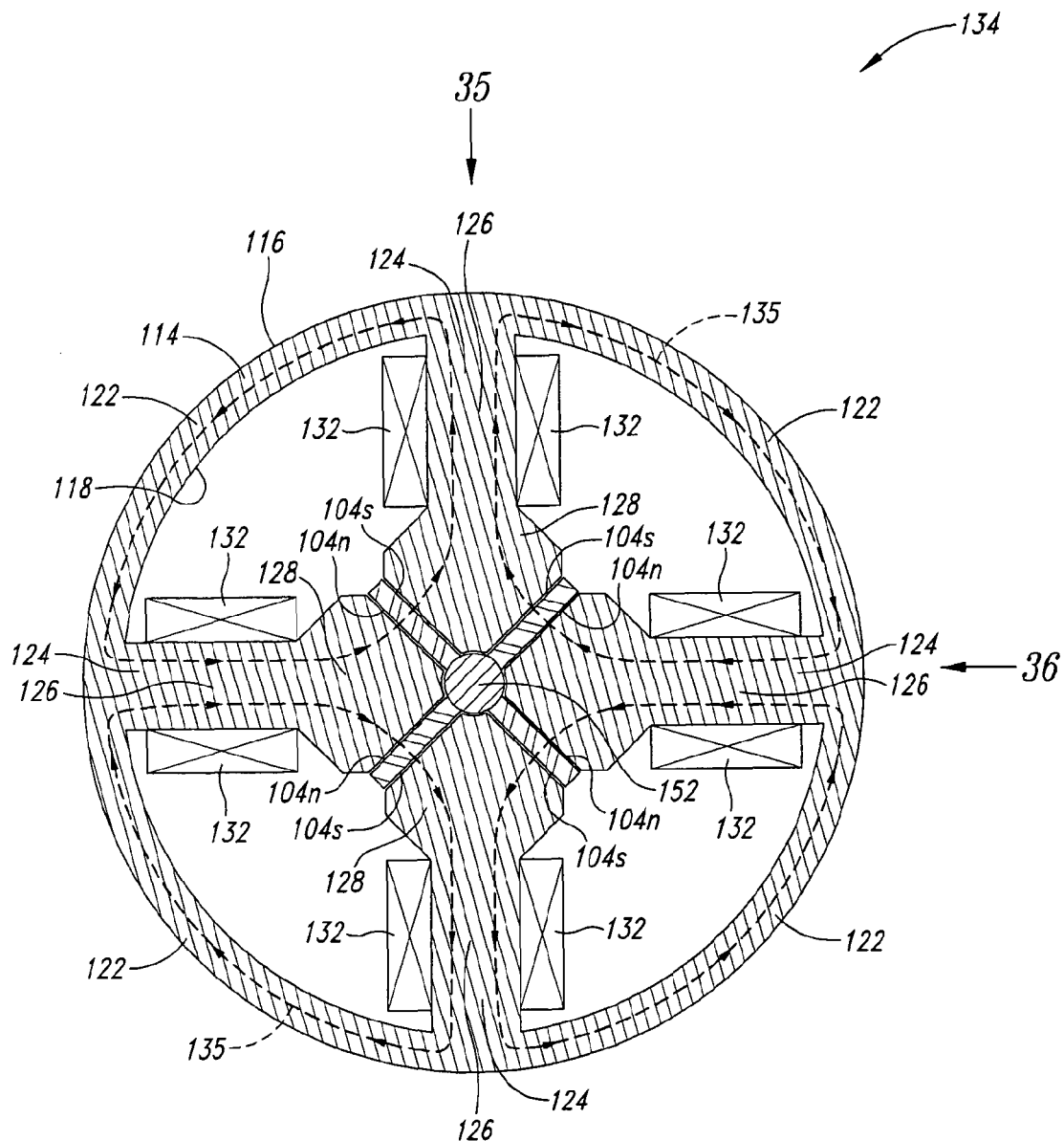
FIG. 37 is an end view of the eleventh alternative linear electrodynamic assembly of FIG. 34 showing illustrative magnetic flux lines.

An eleventh exemplary alternative of the linear electrodynamic assembly 134 is shown in FIG. 34 has having the fourth alternative magnet assembly 106 with a tenth exemplary alternative of the stator assembly 120 with the stator poles 124 each having two of the end surfaces 130 opposingly angled in a shape to be positioned within the V pattern of two of the magnet pairs 100. In this eleventh alternative of the linear electrodynamic assembly 134, each side of the first magnets 102 and the second magnets 104 are near one of the end surfaces 130 of the stator poles 124. Consequently, the stator member 114 is not used. FIGS. 35 and 36 further show how the first magnets 102 and the second magnets 104 are arranged on the shaft 152. Flux lines are shown in FIG. 37 to loop through a first of the magnet pairs 100, through a first one of the stator poles 124, through a portion of the pole support 122 to a second one of the stator poles adjacent the first stator pole, through the second one of the stator poles back to the first of the magnet pair.

From the foregoing it will be appreciated that, although specific embodiments of the invention have been described herein for purposes of illustration, various modifications may be made without deviating from the spirit and scope of the invention. For instance, particular four and eight pole exemplary implementations were depicted herein, however, other even numbers of poles could also be used in other implementations. Accordingly, the invention is not limited except as by the appended claims.

The invention claimed is:

1. A linear electrodynamic system comprising:
a mover member configured to reciprocate having a path of travel including a first position of travel and a second position of travel;
a plurality of magnet pairs each comprising a first magnetic material coupled to the mover member and a second magnetic material coupled to the mover member, the first magnetic material positioned adjacent to the second magnetic material along the path of travel, the first magnetic material having a first surface portion of a first polarity and a second surface portion of a second polarity, the first surface portion of the first magnetic material being convex, the second magnetic material having a first surface portion of the second polarity and a second surface portion of the first polarity, the first polarity being an opposite polarity of the second polarity, the first surface portion of the second magnetic material being convex;

a stator comprising a stator assembly and a stator member, the stator being coaxial with the mover member on an axis parallel to the path of travel, the stator assembly being closer to the axis than the stator member, the stator assembly being coupled to the stator member and spaced therefrom such that the stator assembly is substantially stationary relative to the stator member when the mover member reciprocates along the path of travel, the stator assembly comprising a pole support and a plurality of stator poles each having an end portion and extending outwardly from the pole support toward the mover member, the first surface portion of the first magnetic material of each of the plurality of magnet pairs being in juxtaposition with the end portion of one of the plurality of stator poles of the stator assembly and the second surface portion of the first magnetic material of each of the plurality of magnet pairs being in juxtaposition with the stator member when the mover member is at the first position of travel, the first surface portion of the second magnetic material of each of the plurality of magnet pairs being in juxtaposition with the end portion of one of the plurality of stator poles of the stator assembly and the second surface portion of the second magnetic material of each of the plurality of magnet pairs being in juxtaposition with the stator member when the mover member is at the second position of travel, wherein the stator assembly, the stator member, and the mover member are so arranged to allow for a magnetic flux loop to pass therethrough, the flux loop defining a plane, wherein the path of travel is substantially perpendicular to the plane; and for each of the plurality of stator poles, a winding wound about the stator pole and positioned between the end portion of the stator pole and the pole support.

2. The system of claim 1 further including a holder portion having a first surface with a first radius of curvature, wherein the first surface portions of the first magnetic material and the second magnetic material of the plurality of magnet pairs each have a second radius of curvature smaller than the first radius of curvature, the first magnetic material and the second magnetic material of each of the plurality of magnet pairs is coupled to the mover member through the holder portion, the first surface portions of the first magnetic material of the plurality of magnet pairs define a shape therebetween other than a cylinder, and the first surface portions of the second magnetic material of the plurality of magnet pairs define a shape therebetween other than a cylinder.

3. The system of claim 2 wherein the first magnetic material and the second magnetic material of each of the plurality of magnet pairs are recessed within a wall of the holder portion.

4. The system of claim 2 wherein the first magnetic material and the second magnetic material of each of the plurality of magnet pairs are affixed to a second surface of the holder portion.

5. The system of claim 2 wherein the first magnetic material and the second magnetic material of each of the plurality of magnet pairs are affixed to the first surface of the holder portion.

6. The system of claim 2 wherein the holder portion is shaped as a portion of a cylinder.

7. The system of claim 1, wherein each of the plurality of stator poles corresponds with a different one of the plurality of magnet pairs, the first surface portions of the first and second magnetic materials of each of the plurality of magnet pairs have substantially identical convex shapes, and the end portions of the plurality of stator poles each have an outer surface having an outer surface shape corresponding to the convex shapes of the first surface portions of the first and second magnetic materials of the different one of the plurality of magnet pairs corresponding to the stator pole.

8. The system of claim 1, wherein each of the plurality of stator poles corresponds with a different one of the plurality of magnet pairs, the first surface portions of the first and second magnetic materials of each of the plurality of magnet pairs have substantially identical convex shapes, and the end portions of the plurality of stator poles each have an outer surface having an outer surface shape corresponding to the convex shapes of the first surface portions of the first and second magnetic materials of the different one of the plurality of magnet pairs corresponding to the stator pole.

9. A linear electrodynamic system comprising:

a magnet assembly configured to reciprocate along a path of travel including a first position of travel and a second position of travel;

a first magnet pair;

a second magnet pair, each of the first and second magnet pairs comprising a first magnet coupled with and part of the magnet assembly, the first magnet having an interior surface portion with a first polarity, the first magnet having an exterior surface portion with a second polarity, the second polarity being an opposite polarity of the first polarity, each of the first and second magnet pairs further comprising a second magnet coupled with and part of the magnet assembly, the second magnet being positioned adjacent to the first magnet of the magnet pair along the path of travel, the second magnet having an interior surface portion with the second polarity, the second magnet having an exterior surface portion with the first polarity;

a stator member coaxial with the magnet assembly on an axis parallel to the direction of the path of travel;

a stator assembly coaxial with the axis and nearer the axis than the stator, member, the stator assembly having a first pole and a second pole, the first and second poles each having an end portion and extending radially away from the axis toward the stator member, the end portions of the first and second poles being separated from the stator member by a gap, the first and second poles defining a plane, wherein the path of travel is substantially perpendicular to the plane;

a first winding wound about the first pole and spaced from the end portion of the first pole toward the axis; and a different second winding wound about the second pole and spaced from the end portion of the second pole toward the axis, wherein the interior surface portion of the first magnet of the first magnet pair is in juxtaposition with the end portion of the first pole and the exterior surface portion of the first magnet of the first magnet pair is in juxtaposition with the stator member when the magnet assembly is at the first position of travel, the interior surface portion of the second magnet of the first magnet pair is in juxtaposition with the end portion of the first pole and the exterior surface portion of the second magnet of the first magnet pair is in juxtaposition with the stator member when the magnet assembly is at the second position of travel, the interior surface portion of the first magnet of the second magnet pair is in juxtaposition with the end portion of the second pole and the exterior surface portion of the first magnet of the second magnet pair is in juxtaposition with the stator member when the magnet assembly is at the first position of travel, the interior surface'portion of the second magnet of the second magnet pair is in juxtaposition with the end portion of the second pole and the exterior surface portion of the second magnet of the second magnet pair is in juxtaposition with the stator member when the magnet assembly is at the second position of travel, the interior surface portions of the first magnets of the first and second magnet pairs and the interior surface portions of the second magnets of the first and second magnet pairs each have a convex shape, and the stator assembly, the stator member, and the magnet assembly are so arranged to allow for a magnetic flux loop to pass therethrough, the flux loop defining a plane, wherein the path of travel is substantially perpendicular to plane.

10. The system of claim 9 wherein the first pole extends away from the axis in a first radial direction and the second pole extends away from the axis in a second radial direction different from the first radial direction.

11. A linear electrodynamic system comprising:
a mover member configured to reciprocate having a path of travel including a first position of travel and a second position of travel;
a plurality of magnet pairs each comprising a first magnetic material coupled to the mover member and a second magnetic material coupled to the mover member, the first magnetic material positioned adjacent to the second magnetic material along the path of travel, the first magnetic material having a first surface portion of a first polarity and a second surface portion of a second polarity, the second magnetic material having a first surface portion of the second polarity and a second surface portion of the first polarity, the first polarity being an opposite polarity of the second polarity;
a stator comprising a stator assembly and a stator member, the stator being coaxial with the mover member on an axis parallel to the path of travel, the stator assembly being closer to the axis than the stator member, the stator assembly being coupled to the stator member and spaced therefrom such that the stator assembly is substantially stationary relative to the stator member when the mover member reciprocates along the path of travel, the stator assembly comprising a pole support and a plurality of stator poles each having an end portion and extending outwardly from the pole support toward the mover member, the first surface portion of the first magnetic material of each of the plurality of magnet pairs being in juxtaposition with the end portion of one of the plurality of stator poles of the stator assembly and the second surface portion of the first magnetic material of each of the plurality of magnet pairs being in juxtaposition with the stator member when the mover member is at the first position of travel, the first surface portion of the second magnetic material of each of the plurality of magnet pairs being in juxtaposition with the end portion of one of the plurality of stator poles of the stator assembly and the second surface portion of the second magnetic material of each of the plurality of magnet pairs being in juxtaposition with the stator member when the mover member is at the second position of travel, wherein the stator assembly, the stator member, and the mover member are so arranged to allow for a magnetic flux loop to pass therethrough, the flux loop defining a plane, wherein the path of travel is substantially perpendicular to the plane;

for each of the plurality of stator poles, a winding wound about the stator pole and positioned between the end portion of the stator pole and the pole support; and a holder portion having a first surface with a first radius of curvature, wherein the first surface portions of the first magnetic material and the second magnetic material of the plurality of magnet pairs each have a second radius of curvature smaller than the first radius of curvature, the first magnetic material and the second magnetic material of each of the plurality of magnet pairs is coupled to the mover member through the holder portion, the first surface portions of the first magnetic material of the plurality of magnet pairs define a shape therebetween other than a cylinder, and the first surface portions of the second magnetic material of the plurality of magnet pairs define a shape therebetween other than a cylinder.

12. The system of claim 11 wherein the first surface portion of the first magnetic material of each of the plurality of magnet pairs and the first surface portion of the second magnetic material of each of the plurality of magnet pairs are concave.

13. The system of claim 11 wherein the first magnetic material and the second magnetic material of each of the plurality of magnet pairs are recessed within a wall of the holder portion.

14. The system of claim 11 wherein the first magnetic material and the second magnetic material of each of the plurality of magnet pairs are affixed to a second surface of the holder portion.

15. The system of claim 11 wherein the first magnetic material and the second magnetic material of each of the plurality of magnet pairs are affixed to the first surface of the holder portion.

16. The system of claim 11 wherein the holder portion is shaped as a portion of a cylinder.

17. The system of claim 11, wherein each of the plurality of stator poles corresponds with a different one of the plurality of magnet pairs,
the first surface portions of the first and second magnetic materials of each of the plurality of magnet pairs have substantially identical convex shapes, and
the end portions of the plurality of stator poles each have an outer surface having an outer surface shape corresponding to the convex shapes of the first surface portions of the first and second magnetic materials of the different one of the plurality of magnet pairs corresponding to the stator pole.

18. A linear electrodynamic system comprising:
a mover member configured to reciprocate having a path of travel including a first position of travel and a second position of travel;
a plurality of magnet pairs each comprising a first magnetic material coupled to the mover member and a second magnetic material coupled to the mover member, the first magnetic material positioned adjacent to the second magnetic material along the path of travel, the first magnetic material having a first surface portion of a first polarity and a second surface portion of a second polarity, the second magnetic material having a first surface portion of the second polarity and a second surface portion of the first polarity, the first polarity being an opposite polarity of the second polarity, the first surface portions of the first and second magnetic materials of each of the plurality of magnet pairs have substantially identical contoured shapes, the contoured shapes of the first surface portions of the first magnetic materials of the plurality of magnet pairs defining a shape other than a cylinder therebetween;

a stator comprising a stator assembly and a stator member, the stator being coaxial with the mover member on an axis parallel to the path of travel, the stator assembly being closer to the axis than the stator member, the stator assembly being coupled to the stator member and spaced therefrom such that the stator assembly is substantially stationary relative to the stator member when the mover member reciprocates along the path of travel, the stator assembly comprising a pole support and a plurality of stator poles each having an end portion and extending outwardly from the pole support toward the mover member, each of the plurality of stator poles corresponding with a different one of the plurality of magnet pairs, the end portion of each of the plurality of stator poles having an outer surface having an outer surface shape corresponding to the contoured shapes of the first surface portions of the first and second magnetic materials of the different one of the plurality of magnet pairs corresponding to the stator pole, the first surface portion of the first magnetic material of each of the plurality of magnet pairs being in juxtaposition with the end portion of the corresponding one of the plurality of stator poles of the stator assembly and the second surface portion of the first magnetic material of each of the plurality of magnet pairs being in juxtaposition with the stator member when the mover member is at the first position of travel, the first surface portion of the second magnetic material of each of the plurality of magnet pairs being in juxtaposition with the end portion of the corresponding one of the plurality of stator poles of the stator assembly and the second surface portion of the second magnetic material of each of the plurality of magnet pairs being in juxtaposition with the stator member when the mover member is at the second position of travel, wherein the stator assembly, the stator member, and the mover member are so arranged to allow for a magnetic flux loop to pass therethrough, the flux loop defining a plane, wherein the path of travel is substantially perpendicular to the plane; and for each of the plurality of stator poles, a winding wound about the stator pole and positioned between the end portion of the stator pole and the pole support.

19. The system of claim 18 wherein the first surface portion of the first magnetic material of each of the plurality of magnet pairs and the first surface portion of the second magnetic material of each of the plurality of magnet pairs are concave.

20. The system of claim 18 wherein the first surface portion of the first magnetic material of each of the plurality of magnet pairs and the first surface portion of the second magnetic material of each of the plurality of magnet pairs are convex.

21. The system of claim 18 further including a holder portion having a first surface with a first radius of curvature, wherein the first surface portions of the first magnetic material and the second magnetic material of the plurality of magnet pairs each have a second radius of curvature smaller than the first radius of curvature, and the first magnetic material and the second magnetic material of each of the plurality of magnet pairs is coupled to the mover member through the holder portion.

22. The system of claim 21 wherein the first magnetic material and the second magnetic material of each of the plurality of magnet pairs are recessed within a wall of the holder portion.

23. The system of claim 21 wherein the first magnetic material and the second magnetic material of each of the plurality of magnet pairs are affixed to a second surface of the holder portion.

24. The system of claim 21 wherein the first magnetic material and the second magnetic material of each of the plurality of magnet pairs are affixed to the first surface of the holder portion.

25. The system of claim 21 wherein the holder portion is shaped as a portion of a cylinder.

* * * * *